US011885633B1

(12) United States Patent
Bustos et al.

(10) Patent No.: US 11,885,633 B1
(45) Date of Patent: Jan. 30, 2024

(54) INTELLIGENTLY RESTRICTING TRANSPORTATION CHANGES BASED ON TRANSPORTATION SIGNALS IN A TRANSPORTATION MATCHING SYSTEM

(71) Applicant: Lyft, Inc., San Francisco, CA (US)

(72) Inventors: Mark Paul Bustos, San Francisco, CA (US); Elizabeth Jill Hamp, San Francisco, CA (US); Young Kyo Kim, San Francisco, CA (US); Vinson Brockman Lee, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 506 days.

(21) Appl. No.: 16/727,756

(22) Filed: Dec. 26, 2019

(51) Int. Cl.
*G06K 19/06* (2006.01)
*G01C 21/36* (2006.01)
*G06N 20/00* (2019.01)
*G06Q 20/40* (2012.01)
*G01C 21/34* (2006.01)

(52) U.S. Cl.
CPC ....... *G01C 21/362* (2013.01); *G01C 21/3438* (2013.01); *G01C 21/3676* (2013.01); *G06N 20/00* (2019.01); *G06Q 20/40* (2013.01)

(58) Field of Classification Search
CPC .............. G01C 21/362; G01C 21/3438; G01C 21/3676; G06N 20/00; G06Q 20/40
See application file for complete search history.

(56) References Cited

U.S. PATENT DOCUMENTS

| | | | |
|---|---|---|---|
| 2009/0051518 A1* | 2/2009 | Flick | G08G 1/052 340/441 |
| 2012/0092194 A1* | 4/2012 | Crucs | G08G 1/123 455/412.2 |
| 2012/0109516 A1* | 5/2012 | Miyazaki | G01C 21/367 701/428 |
| 2016/0301698 A1* | 10/2016 | Katara | G06F 16/9554 |
| 2019/0066516 A1* | 2/2019 | Kuhara | G06Q 10/02 |
| 2019/0360833 A1* | 11/2019 | Liu | G01C 21/3415 |
| 2020/0233420 A1* | 7/2020 | Liu | G05D 1/0088 |

* cited by examiner

*Primary Examiner* — Jess Whittington
(74) *Attorney, Agent, or Firm* — Keller Preece PLLC

(57) ABSTRACT

The present disclosure relates to systems, non-transitory computer-readable media, and methods for intelligently restricting transportation changes based on signals in a dynamic transportation matching system. For example, the disclosed systems can analyze signals associated with transportation of a requestor by a vehicle of a provider to determine whether a transportation-change request is indicated. In response to determining that a transportation-change request is indicated, the disclosed systems can prevent a transportation change to a destination, route, or waypoint and generate a restriction notification. The disclosed system can also provide the restriction notification to at least a provider client device in response to determining that it is safe to do so.

20 Claims, 13 Drawing Sheets

INTELLIGENTLY RESTRICTING TRANSPORTATION CHANGES BASED ON TRANSPORTATION SIGNALS IN A TRANSPORTATION MATCHING SYSTEM

BACKGROUND

Transportation matching systems commonly use web and mobile applications to manage on-demand requests for transportation from providers. By using such web applications and mobile applications, on-demand transportation matching systems pair providers with requestors to transport such requestors from a pickup location to a destination location. To initiate transportation and requestor-provider matching, requestors generally specify a pickup location and a destination location as part of an initial transportation request. In some cases, however, on-demand transportation matching systems change a destination location in response to a transportation-change request or detect a destination location for drop off conflicting with a transportation request. On-demand transportation matching systems receive or detect such destination changes or other transportation changes often after matching a provider with the requestor or after the provider picks up the requestor.

While requestors or providers frequently change a destination location or add stops to reflect a change of plans, some requestors or providers change a destination or stops en route unaware that a payment card for transportation has insufficient funding, opportunistically change a destination en route, or make irregular route modifications to avoid (or decrease) payment for transportation. Despite improving the computing processes for changing destination locations en route and rerouting providers, conventional on-demand transportation matching systems lack the computational speed and computational models to efficiently detect faulty or opportunistic transportation changes, particularly in real (or near-real) time. Further to the point, conventional transportation matching systems often apply rigid rule-based heuristics that inaccurately detect opportunistic destination changes or other transportation changes and increase back-and-forth communications among such systems and provider or requestor computing devices.

As an example, conventional transportation matching systems often cannot distinguish between earnest, faulty, and opportunistic changes to a destination during the course of transportation. When an on-demand transportation matching system detects or receives hundreds or thousands (or more) transportation changes per minute or per hour, such systems often lack computational models that accurately identify a faulty or opportunistic destination change or other transportation change in real (or near-real) time. Because a transportation includes many points before pickup and along a route, some providers or requestors mimic earnest transportation-change requests or strategically time a transportation-change request with a requestor device, provider device, or in-person communication to evade real-time detection. By failing to detect or even granting such change requests, conventional transportation matching systems facilitate providers or requestors in traveling to alternative destinations without appropriate compensation or authorization from a requestor device.

Because conventional transportation matching systems often fail to detect faulty or opportunistic transportation changes, such conventional systems can waste computing resources in processing communications for transportation-change requests or processing (and reprocessing) card-payment requests during or after transport. For instance, in some cases, requestors strategically time multiple transportation-change requests along points of transport to extend transportation to a more distant destination. In failing to detect such opportunism, conventional transportation matching systems repeatedly transmit communications to update both requestor and computing devices.

Even when conventional transportation matching systems grant or deny transportation-change requests during transport, such conventional systems often apply an inflexible approach. For example, conventional systems typically grant or deny transportation-change requests utilizing rote computational heuristics. To illustrate, some conventional transportation matching systems apply a set of pre-defined rules that grant transportation-change requests before a point during transportation (e.g., pickup) and deny such transportation-change requests after such a point during transportation. This conventional approach, however, inflexibly ignores relevant real-time data that may arise before or during transportation.

SUMMARY

This disclosure describes embodiments of systems, non-transitory computer-readable media, and methods that solve the foregoing problems in addition to providing other benefits. In particular, the disclosed systems intelligently analyze signals corresponding to transport of a requestor by a vehicle and (based on such signals) notify a mobile device for the vehicle of a restriction preventing a transportation change to a destination, route, or waypoint. For example, the disclosed systems can detect stages of a vehicle transporting a requestor to a destination and intelligently analyze signals associated with the transportation. Such signals may be real-time signals before or during active transport and indicate a request to change the destination to an alternative destination, change a route, or add or change a waypoint. Based on analyzing such signals, the disclosed systems determine to restrict changes to the transportation and provide a mobile device for the vehicle with a notification that indicates a restriction preventing a transportation change to a destination, route, or waypoint. Based further on analyzing current vehicle safety factors, in some cases, the disclosed systems provide such a notification to the mobile device when the vehicle is in a safe condition.

BRIEF DESCRIPTION OF THE DRAWINGS

The detailed description refers to the drawings briefly described below.

DETAILED DESCRIPTION

Figure 1:
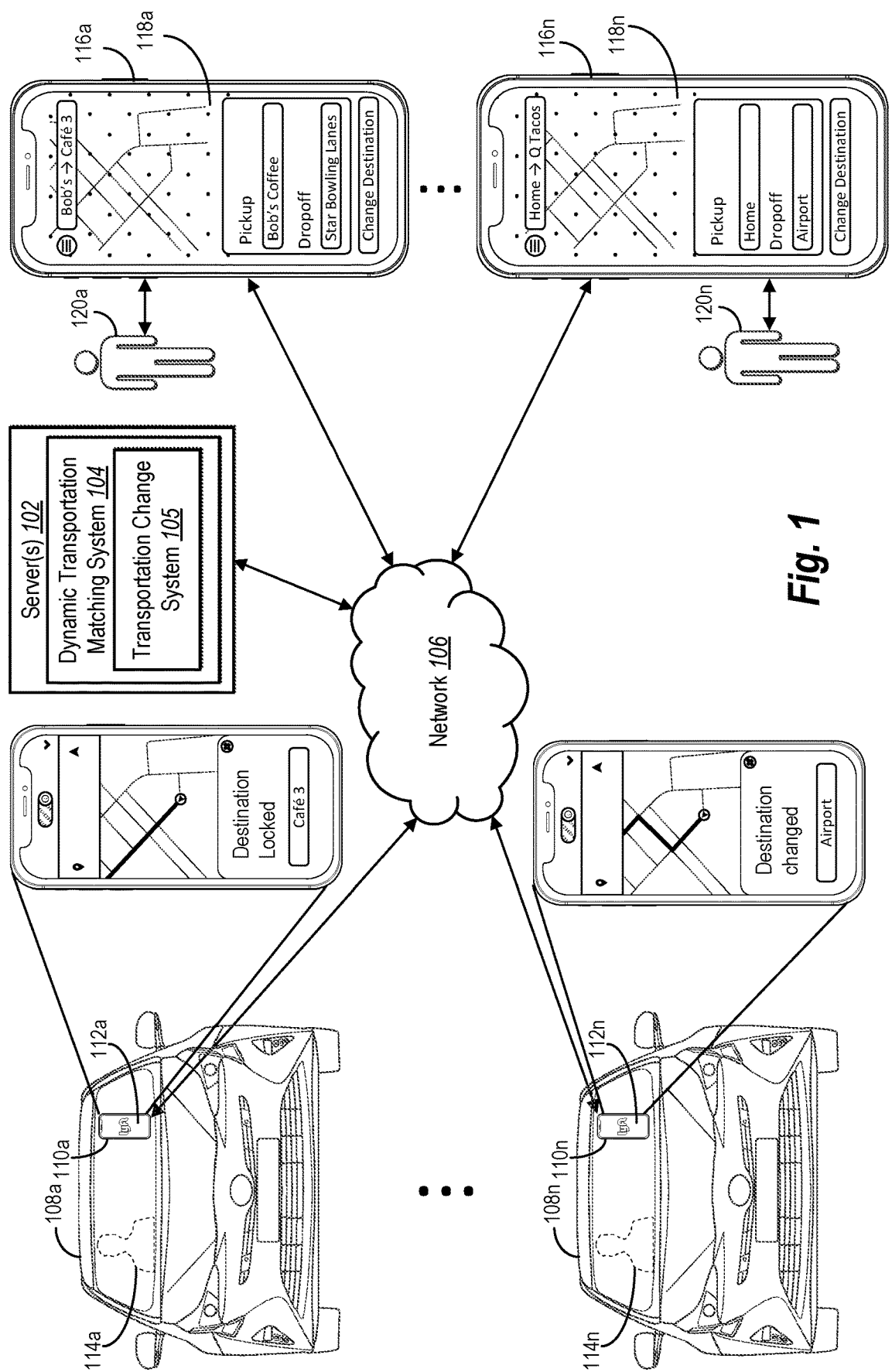
FIG. 1 illustrates an example environment in which a dynamic transportation matching system and a transportation change system operate in accordance with one or more embodiments.

This disclosure describes one or more embodiments of a transportation change system that intelligently analyzes signals corresponding to transport of a requestor by a vehicle and (based on such signals) notifies a mobile device for the vehicle of a restriction preventing a transportation change to a destination, route, or waypoint. For example, in some embodiments, the transportation change system detects one or more transportation stages associated with transportation of a requestor to a destination by a vehicle. The transportation change system also analyzes signals associated with the transportation. Such signals indicate a transportation-change request to change a destination, route, or waypoint. Based on the signals, the transportation change system determines to restrict a transportation change and generates a notification for a mobile device associated with the vehicle of such a restriction. The transportation change system further provides the notification to the mobile device indicating the restriction preventing the transportation change.

As suggested above, in one or more embodiments, the transportation change system detects various transportation stages relative to a particular transportation or a transportation request. For example, the transportation change system may detect a provider computing device in an offline stage, an idling stage, a pickup stage, an in-transit stage, or a drop-off stage corresponding to a transportation request. Alternatively, in some embodiments, the transportation change system detects such stages with reference to a transportation request, such as a request stage, a pickup stage, a destination-change stage, or a drop-off stage.

Based on (or while monitoring) such transportation stages, the transportation change system analyzes signals associated with the transportation to determine whether to restrict changes to a requestor's destination. As suggested above, the transportation change system may identify signals indicating a request to change a destination, route, or waypoint. The transportation change system can also analyze additional signals. For example, the transportation change system can extract and analyze signals including, but not limited to, the speed of the vehicle associated with the provider computing device, payment-card information associated with the matched transportation request, a transportation history of a provider associated with the provider computing device, and information associated with a transportation-change request (e.g., the timing of the request, the source of the request).

In one or more embodiments, the transportation change system can determine whether to restrict changes to the destination utilizing a computational model. For example, in some embodiments, the transportation change system generates a signal vector based on one or more signals. Based on the signal vector, the transportation change system uses a transportation-change-machine-learning model to generate a destination-restriction metric indicating a restriction on changing a requestor's destination, route, or waypoint. In at least one embodiment, the transportation change system trains the transportation-change-machine-learning model to output such destination-restriction metrics based on training destination-restriction metrics and corresponding ground-truth data.

After determining to restrict transportation changes, the transportation change system can generate a restriction notification. Based on settings of a provider software application or notification preferences associated with the provider computing device, for instance, the transportation change system can generate a notification, such as a banner, a popup, or other notification including information associated with the restriction. The transportation change system can provide the restriction notification to one or both of the provider computing device associated with a provider and a requestor computing device associated with a requestor.

In at least one embodiment, to avoid unnecessarily distracting the provider (e.g., driver) while driving the vehicle, the transportation change system can perform a safety analysis prior to providing the restriction notification to the provider computing device. For example, the transportation change system can analyze safety factors, such as, but not limited to, a detected speed of the provider vehicle, a detected transportation stage, and traffic conditions or weather conditions associated with a detected location of the vehicle. Based on such safety factors, if the transportation change system determines that it is safe to provide the restriction notification, the transportation change system provides the restriction notification to the provider computing device.

As mentioned above, conventional transportation matching systems lack the computational speed and computation models to efficiently determine whether to grant or deny a transportation change. Instead, conventional systems waste client resources in processing opportunistic transportation changes when a payment and route integrity check indicate that a change to a destination, route, or waypoint would be inappropriate. To identify and reject potentially opportunistic transportation-change requests, some conventional systems use rote heuristics or rules. For instance, some conventional systems approve transportation-change requests if the system authorized the transportation request for an initial destination based on a requestor's payment card—without performing a subsequent authorization check for a change to a destination, route, or waypoint. These pre-defined rules fail to account for valuable real-time data that can arise during active transportation (e.g., timing of a transportation-change request, a source of a request). By granting opportunistic transportation-change requests, conventional systems communicate unnecessary destination updates, reroute vehicles without corresponding funding, and otherwise waste system resources.

In comparison to conventional systems, the transportation change system improves the accuracy, flexibility, and efficiency with which a transportation matching system approves or restricts transportation changes. Rather than applying rote heuristics, for example, the transportation change system efficiently analyzes signals corresponding to a particular transportation or a transportation request to intelligently approve earnest transportation changes or restrict opportunistic transportation changes. The transportation change system can both accurately detect (i) opportunistic transportation-change requests from a requestor or a provider based on such signal and (ii) opportunistic transportation changes made on the ground that a requestor and provider communicate in person. By accurately restricting opportunistic transportation changes, the transportation change system decreases a number of communications between a transportation matching system and provider or requestor computing devices—obviating back-and-forth communications as destinations sometime repeatedly change in strategic gamesmanship.

In some embodiments, for instance, the transportation change system utilizes a transportation-change-machine-learning model to analyze real-time (or near real-time) transportation signals to efficiently determine whether to approve or deny a change in destination, route, or waypoint. By training such a transportation-change-machine-learning model to analyze different combinations of signals—from a transportation history associated with a provider, to the timing of a transportation-change request, to characteristics of an account for a requestor—the transportation-change-machine-learning model learns to accurately distinguish between earnest transportation changes with sufficient funding and opportunistic transportation changes structured to avoid transportation costs.

In addition to improved accuracy, the transportation change system flexibly analyzes real-time transportation signals at various points either before or during active transportation. Rather than utilizing a strict rule-based approach, in some embodiments, the transportation change system analyzes real-time transportation signals to identify a transportation change (or possible transportation change) and determine whether to approve or deny such a transportation change at various stages of transportation, such as before or during a pickup stage, a destination-change stage, or a drop-off stage. As signals change or additional signals come, the transportation change system can re-analyze signals to re-determine whether to approve or restrict a transportation change at such stages of transportation. Accordingly, the transportation change system can flexibly adjust determinations to more effectively restrict opportunistic transportation changes as signals or strategies change en route.

Unlike conventional systems that apply rules based on initial authorizations, in some embodiments, the transportation change system can determine to approve or restrict a transportation change on the fly. By extemporaneously analyzing signals for a transportation or request, the transportation change system can apply a transportation-change-machine-learning model to distinguish signals in real (or near-real) time. Rather than a back-end calculation of signals after a change in destination, route, or waypoint or after a transportation vehicle drops off a requestor, therefore, the transportation change system can make real-time restriction decisions with better accuracy than conventional-detection methods.

As illustrated by the foregoing discussion the present disclosure utilizes a variety of terms to describe features and advantages of the transportation change system. For example, as used herein, the term "transportation request" refers to a request from a requesting individual (i.e., a requestor) for transport by a transportation vehicle. In particular, a transportation request includes a request for a transportation vehicle to transport a requestor or a group of individuals from one geographic area to another geographic area. The transportation request can include data associated with a requestor device, including a request location (e.g., a location from which the transportation request is initiated), a destination (e.g., a location to which the requestor wishes to travel), a pickup location or a drop-off location where a requestor can be respectively picked up for transportation or dropped off from transportation (which geographic areas may be the same as or different from the request location and destination), location profile information, a requestor rating, a travel history, a search history, etc. In some cases, a drop-off location constitutes and is the same as a destination. Additionally, or alternatively, a transportation request can include a request to be transported in certain manner (e.g., according to a service category type such as standard, premium, luxury, shared, shared saver, wheel-chair accessible, etc.).

As suggested above, the term "transportation provider" (or simply "provider") refers to a driver or other person who operates a transportation vehicle and/or who interacts with a provider client device, on the one hand, or an autonomous vehicle, on the other hand. For instance, a transportation provider includes a person who drives a transportation vehicle along various transportation routes—or an autonomous vehicle that drives along such transportation routes—to pick up and drop off requestors.

As suggested above, the term "transportation requestor" (or simply "requestor") refers to a person who submits (or is projected to submit) a transportation request to a dynamic transportation matching system and/or who interacts with a requestor client device. For instance, a transportation requestor includes a person who interacts with a requestor client device to send a transportation request to a dynamic transportation matching system. After the dynamic transportation matching system matches a requestor with a provider, the requestor can await pickup by the provider at a predetermined pickup location. Upon arrival of the provider, the requestor can engage with the provider by getting into a transportation vehicle associated with the provider for transport to a destination specified in the requestor's transportation request. Accordingly, a requestor may refer to (i) a person who requests a ride or other form of transportation but who is still waiting for pickup or (ii) a person whom a transportation vehicle has picked up and who is currently riding within the transportation vehicle to a destination.

Figure 3:
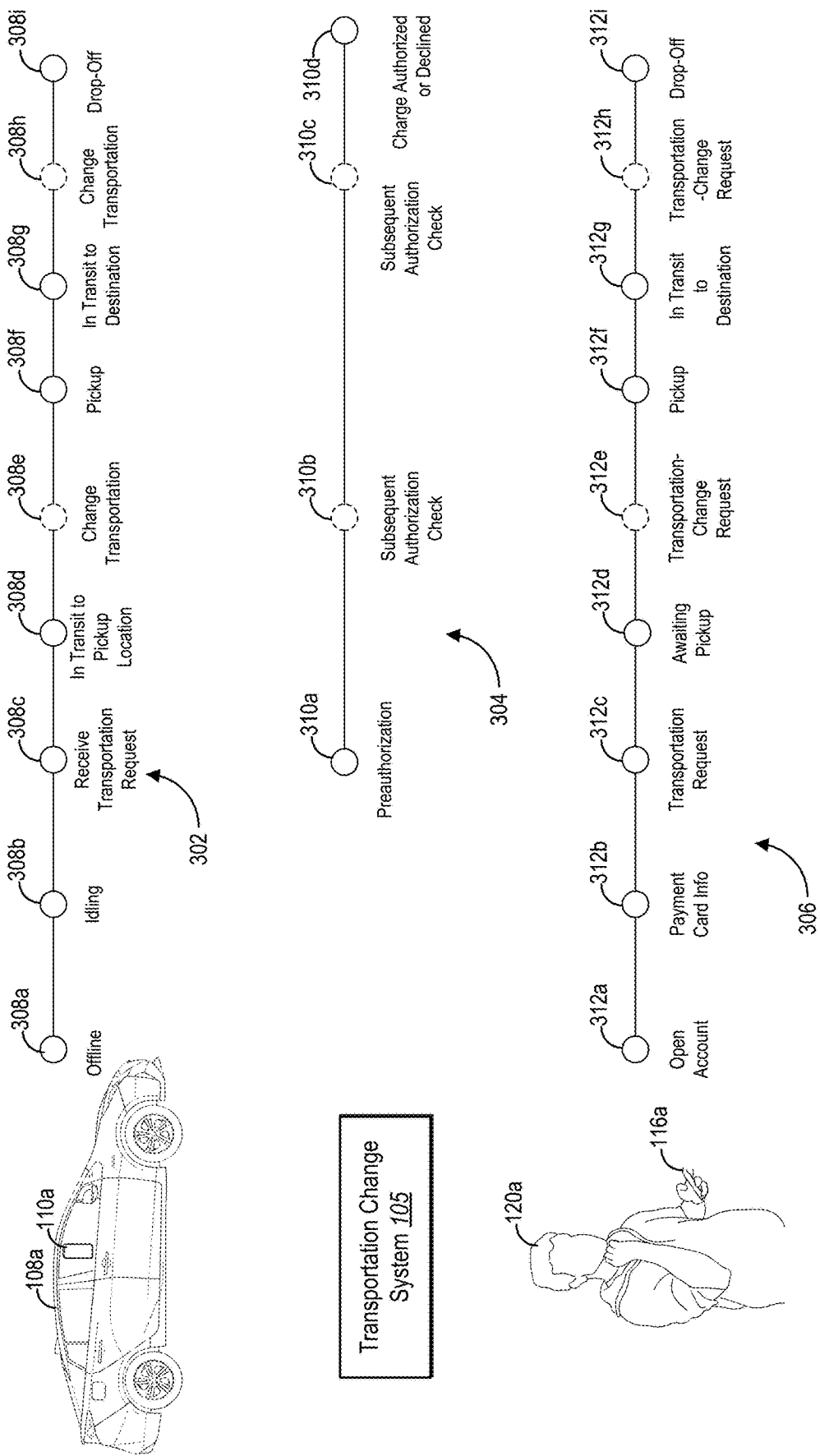
FIG. 3 illustrates timelines for a provider computing device, the transportation change system, and a requestor computing device relative to a request for transportation and a transportation change in accordance with one or more embodiments.

As used herein, the term "transportation stage" refers to a predetermined event, period, or point corresponding to transportation of a requestor. Such a transportation stage may occur before, during, or after a transportation request. For example, in one or more embodiments, transportation stages relative to a transportation include an offline stage, an idling stage, a pickup stage, a transportation-change request stage, an in-transit stage, and a drop-off stage. As described below, in some embodiments, a transportation stage may correspond to a transportation request or a requestor. As described below, FIG. 3 illustrates examples of such transportation stages.

As used herein, the term "transportation-change request" refers to a request to change a destination, a route, or a waypoint associated with the transportation request. Such a transportation-change request may, for example, (i) request a change from one destination to another destination, (ii) request a modification to a route for traveling from a pickup location or a waypoint to a destination or another waypoint (e.g., by following an irregular route), or (iii) request an addition or a change to a waypoint along a route. In some cases, a transportation-change request includes a request by a provider or a requestor through in-person communication (e.g., a verbal request from a requestor to a provider) or via a computing device to change a destination, a route, or a waypoint for transportation. Accordingly, a dynamic transportation matching system may receive a transportation-change request from either a provider client device or a requestor client device associated with the transportation request. Additionally, a transportation-change request may be received by a dynamic transportation matching system at any point after the dynamic transportation matching system receives a transportation request until a provider drops off a requestor.

To illustrate, the dynamic transportation system can receive a transportation-change request based on a route modification when a provider or requestor selects an alternate route to get from a pickup location to a drop off location. The dynamic transportation system can detect a transportation-change request based on route irregularities when the transportation vehicle departs from a set route from a pickup location to a drop off location. The dynamic transportation system can receive a transportation-change request based on adding or changing a waypoint when the provider or requestor client devices indicate a change or addition in waypoint (e.g., a stop mid-route; for example a stop at a pharmacy on the way home).

Relatedly, the term "transportation change" refers to a change to a destination, a route, or a waypoint associated with a transportation request. Such a transportation change may, for example, (i) change one destination to another destination, (ii) modify a route for traveling from a pickup location or a waypoint to a destination or another waypoint (e.g., by following an irregular route), or (iii) add or change a waypoint along a route. The term "waypoint" refers to an intermediate or temporary location or point along a route. For example, a waypoint includes a temporary stopping location along a route between a pickup location and a drop-off location.

As used herein, the term "signal" (or sometimes "transportation signal") refers to data indicating an attribute, characteristic, condition, or element of a transportation or transportation request. For example, a signal can include data indicating payment-card information associated with a payment card corresponding to the transportation request, a change-request time for a transportation-change request relative to a requesting time for a transportation request, a current transportation stage, a source of the transportation-change request (e.g., the provider or the requestor), current vehicle conditions (e.g., speed, direction), or current geographic conditions (e.g., weather, traffic). Such signals may be generated or received in real (or near-real) time. Additionally, a signal can include historical data indicating a transportation history of a provider associated with a provider client device, a transportation history of a requestor associated with a requestor client device, and historical transportation metrics associated with the geographic area specified in the transportation request. The foregoing signals are merely examples, and a dynamic transportation matching system may receive other signals, as described below.

In some embodiments, a central server (e.g., the dynamic transportation matching system) receives these and other signals from the provider client device and the requestor client device before, during, and after transportation in order to make transportation restriction determinations. In alternative embodiments, the provider client device may process these and other signals and make determinations as to whether to restrict changing a destination, a route, or a waypoint.

As used herein, the term "safety factors" refers to factors indicating a safety or danger of notifying a provider through a client device of a modification to transportation. For example, safety factors can include a safety or danger of sending a provider a notification for display on a client device while the provider is within a transportation vehicle. Safety factors can include, but are not limited to, a detected speed of the provider's vehicle, a detected transportation stage associated with the transportation, traffic conditions associated with a detected location of the provider's vehicle, and weather conditions associated with the detected location of the provider's vehicle.

As further used herein, the term "machine-learning model" refers to a model with one or more processes that can be tuned (e.g., trained) based on inputs to approximate unknown functions. In particular, the term machine-learning model can learn to approximate complex functions and generate outputs based on inputs provided to the model. For instance, the disclosure describes a transportation-change-machine-learning model. In particular, the transportation management system can train the transportation-change-machine-learning model to generate transportation-restriction metrics based on signals. The transportation-change-machine-learning model can include, for example, linear regression, logistic regression, decision trees, naïve Bayes, k-nearest neighbor, neural networks, long-short term memory, random forests, gradient boosting models, deep learning architectures, classifiers, or a combination of the foregoing.

As used herein, the term "transportation-restriction metric" refers to a value or quantifier indicating an approval or restriction of a transportation change. For example, a transportation-restriction metric can include a probability, a likelihood, a percentage, or a score associated with a payment and route integrity check indicating whether a requestor or corresponding payment card has sufficient funding for (e.g., will pay for) a cost of transportation to a new requested destination, for a new route, or to a new waypoint.

As used herein, the term "training signal" refers to a signal used for training a transportation-change-machine-learning model. In some cases, for instance, a training signal refers to a historical transportation signal corresponding to a ground-truth transportation-restriction metric. As used herein, the term "training-transportation-restriction metric" refers to ground-truth transportation-restriction determinations. For example, one or more training signals correspond to a training-transportation-restriction metric. In some embodiments, one or more training signals correspond to a training-transportation-restriction metric that the transportation change system has already determined to be accurate (e.g., either in simulation or in a real-world scenario). In one or more embodiments, of the transportation change system uses training signals and training-transportation-restriction metrics to train the transportation-change-machine-learning model to output accurate transportation-restriction metrics. Once trained, the transportation-change-machine-learning model can output a transportation-restriction metric in response to receiving a signal vector. As used herein, the term "signal vector" refers to an input vector representing or based on one or more signals.

Turning now to the figures, FIG. 1 illustrates a schematic diagram of an environment 100 for implementing a transportation change system 105 in accordance with one or more embodiments. As shown in FIG. 1, the environment 100 includes server(s) 102 comprising a dynamic transportation matching system 104 and the transportation change system 105, transportation vehicles 108a-108n, provider client devices 110a-110n respectively corresponding to the transportation vehicles 108a-108n, requestor client devices 116a-116n respectively corresponding to requestors 120a-120n, and a network 106. In some embodiments, the transportation vehicles 108a-108n optionally include providers 114a-114n, respectively. The providers 114a-114n in this example are human providers associated with both the transportation vehicles 108a-108n and the provider client devices 110a-110n, respectively.

As shown, in one or more embodiments, the transportation change system 105 can be a component of the dynamic transportation matching system 104 implemented on one or more of the server(s) 102. In these or other embodiments, the transportation change system 105 may perform one or more acts of the present disclosure described in conjunction with the dynamic transportation matching system 104. Additionally, or alternatively, the dynamic transportation matching system 104 may perform one or more acts of the present disclosure described in conjunction with the transportation change system 105. Furthermore, although FIG. 1 depicts the transportation change system 105 and the dynamic transportation matching system 104 as distinct systems, the transportation change system 105 can be implemented in whole or in part by the dynamic transportation matching system 104, and vice-versa.

As indicated by FIG. 1, the dynamic transportation matching system 104 uses the server(s) 102 to communicate with one or both of the provider client devices 110a-110n and the requestor client devices 116a-116n via the network 106. For example, the dynamic transportation matching system 104 communicates with the provider client devices 110a-110n and the requestor client devices 116a-116n via the network 106 to determine locations of the provider client devices 110a-110n and the requestor client devices 116a-116n, respectively. Per device settings, for instance, the dynamic transportation matching system 104 may receive location coordinates from the provider client devices 110a-110n and/or the requestor client device 116a-116n, respectively. Based on the location coordinates, the dynamic transportation matching system 104 matches or assigns one or more of the transportation vehicles 108a-108n with one or more of the requestors 120a-120n for transportation.

As suggested above, each of the provider client devices 110a-110n and the requestor client devices 116a-116n may comprise a mobile device, such as a laptop, smartphone, or tablet associated with a requestor or a provider. The provider client devices 110a-110n and the requestor client devices 116a-116n may be any type of computing device as further explained below with reference to FIG. 9. In some embodiments, one or more of the provider client devices 110a-110n are not associated with providers, but are attached to (or integrated within) the transportation vehicles 108a-108n, respectively.

As further indicated by FIG. 1, the provider client devices 110a-110n include provider applications 112a-112n, respectively. Similarly, the requestor client devices 116a-116n include requestor applications 118a-118n, respectively. In some embodiments, the provider applications 112a-112n (or the requestor applications 118a-118n) comprise web browsers, applets, or other software applications (e.g., native applications) respectively available to the provider client devices 110a-110n or the requestor client devices 116a-116n. Additionally, in some instances, the dynamic transportation matching system 104 provides data including instructions that, when executed by the provider client devices 110a-110n or by the requestor client devices 116a-116n, respectively create or otherwise integrate one of the provider applications 112a-112n or the requestor applications 118a-118n with an application or webpage.

As further indicated by FIG. 1, a requestor may use a requestor application to request transportation services, receive a price estimate for the transportation service, edit a transportation request, or access other transportation-related services. For example, in some cases, the requestor 120a may interact with the requestor client device 116a through graphical user interfaces of the requestor application 118a to request a change in destination, a route, or a waypoint for a transportation request. In turn, the transportation change system 105 detects one or more stages of the transportation vehicle 108a transporting the requestor 120a. Based on analyzing such signals, the transportation change system 105 determines to restrict changes to a destination, a route, or a waypoint for the requestor 120a. The transportation change system 105 accordingly provides a restriction notification to the provider client device 110a via the provider application 112a indicating a restriction on changing a destination, route, or waypoint. FIG. 1 accordingly depicts an enlarged version of the provider client device 110a comprising a restriction notification. In some cases, the transportation change system 105 similarly provides a restriction notification to the requestor client device 116a.

As further depicted in FIG. 1, the dynamic transportation matching system 104 sends requests from one or more of the requestor client devices 116a-116n or other notifications to one or more of the provider client devices 110a-110n within the transportation vehicles 108a-108n, respectively. While FIG. 1 depicts the transportation vehicles 108a-108n as automobiles, a transportation vehicle may also be an airplane, bicycle, motorcycle, scooter, or other vehicle. In some cases, this disclosure describes a transportation vehicle as performing certain functions, but such a transportation vehicle includes an associated provider client device that often performs a corresponding function. For example, when the dynamic transportation matching system 104 sends a transportation request to the transportation vehicle 108a—or queries location information from the transportation vehicle 108a—the dynamic transportation matching system 104 sends the transportation request or location query to the provider client device 110a. Accordingly, the transportation vehicle 108a and the provider client device 110a are part of a vehicle subsystem.

Although not illustrated in FIG. 1, in some embodiments, the environment 100 may have a different arrangement of components and/or may have a different number or set of components altogether. In certain implementations, for instance, some or all of the transportation vehicles 108a-108n do not include a human provider, but constitute autonomous transportation vehicles—that is, a self-driving vehicle that includes computer components and accompanying sensors for driving without manual-provider input from a human operator. As a further example, in some embodiments, one or more of the transportation vehicles 108a-108n include a hybrid self-driving vehicle with both self-driving functionality and some human operator interaction.

When a transportation vehicle is an autonomous vehicle or a hybrid self-driving vehicle, the transportation vehicle may include additional components not depicted in FIG. 1. Such components may include location components, one or more sensors by which the autonomous vehicle navigates, and/or other components necessary to navigate without a provider (or with minimal interactions with a provider).

Regardless of whether a transportation vehicle is associated with a provider, a transportation vehicle optionally includes a locator device, such as a GPS device, that determines the location of the transportation vehicle within the transportation vehicles 108a-108n.

As mentioned above, the transportation vehicles 108a-108n respectively include provider client devices 110a-110n separate or integral to the transportation vehicles 108a-108n. Additionally, or alternatively, the provider client device 110a may be a subcomponent of a vehicle computing system. Regardless of its form, the provider client devices 110a-110n may include various sensors, such as a GPS locator, an inertial measurement unit, an accelerometer, a gyroscope, a magnetometer, and/or other sensors, from which the dynamic transportation matching system 104 can access information, such as location information.

In some embodiments, the dynamic transportation matching system 104 communicates with the provider client devices 110a-110n through the provider applications 112a-112n, respectively. For instance, the provider application 112a can cause the provider client device 110a to communicate with the dynamic transportation matching system 104 to navigate to a pickup location to pick up a requestor; navigate to a destination location; identify a change in destination, route, or waypoint; identify a restriction on changing a destination, route, or waypoint; and/or collect fares. In some cases, the provider application 112a causes the provider client device 110a to communicate with the dynamic transportation matching system 104 to receive and present a restriction notification indicating a restriction on changing a destination, route, or waypoint for a requestor, as described further below.

As shown in FIG. 1, in some embodiments, the transportation change system 105 sends notifications to the provider client devices 110a-110n to display a notification for a change in destination, route, or waypoint or a restriction notification within graphical user interfaces of the provider applications 112a-112n. In some embodiments, for instance, the transportation change system 105 sends a restriction notification to the provider client device 110a indicating a restriction on changing a destination, route, or waypoint for the requestor 120a. The provider client device 110a subsequently displays the restriction notification within a graphical user interface. By contrast, in some embodiments, the transportation change system 105 sends a transportation-change notification to the provider client device 110n indicating a permitted change to a destination, route, or waypoint for the requestor 120n. The provider client device 110n subsequently displays the transportation-change notification within a graphical user interface.

Figure 2:
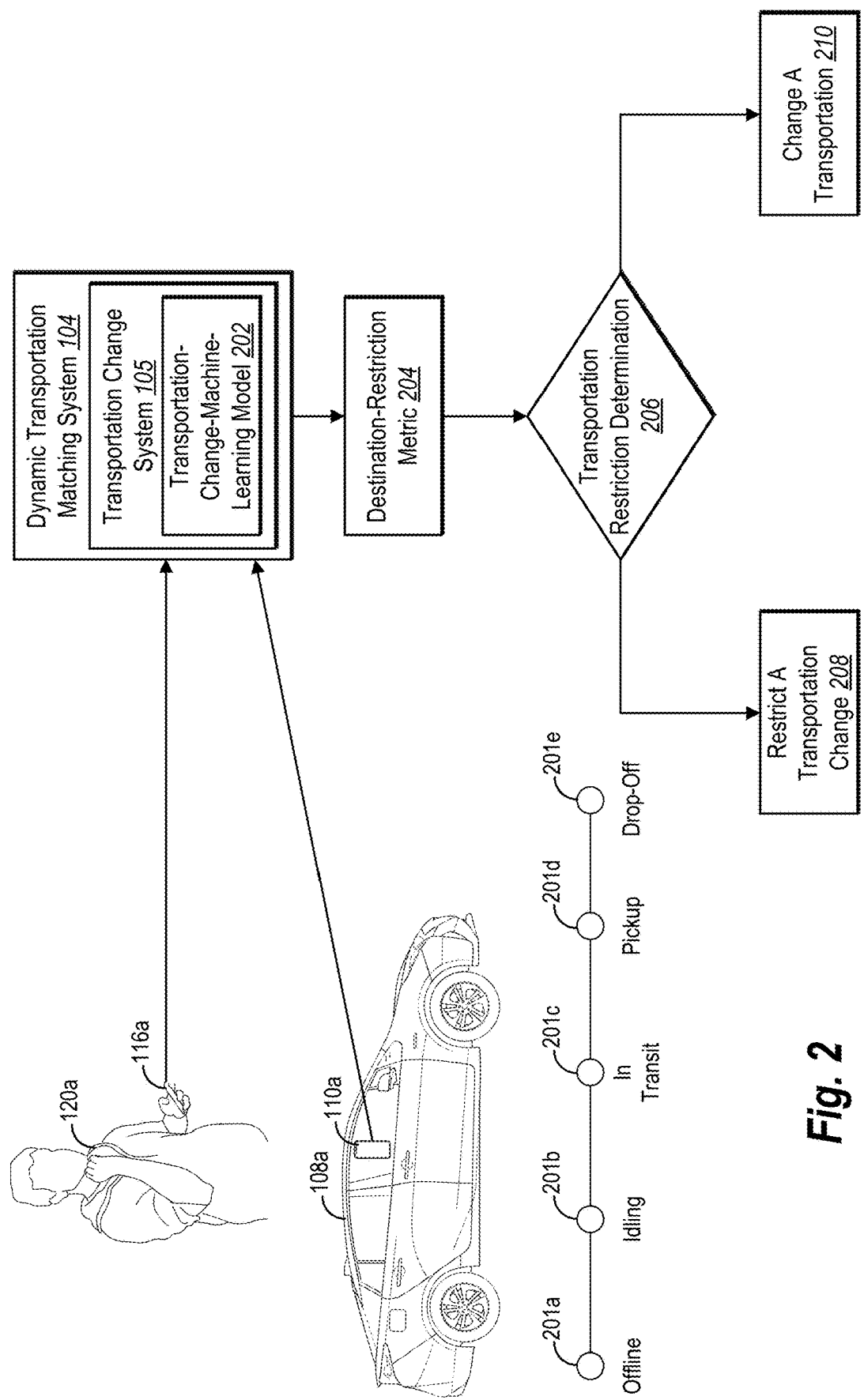
FIG. 2 illustrates an example overview of the transportation change system intelligently analyzing signals corresponding to transport of a requestor by a vehicle and notifying a mobile device for the vehicle of a restriction on changing transportation in accordance with one or more embodiments.

FIG. 2 illustrates an overview of the transportation change system 105 generating and providing a restriction notification in accordance with one or more embodiments. For example, as shown in FIG. 2, the dynamic transportation matching system 104 can receive a transportation request by the requestor 120a from the requestor client device 116a. The dynamic transportation matching system 104 subsequently sends the transportation request to the provider client device 110a associated with the transportation vehicle 108a and (upon acceptance of the transportation request) matches the requestor 120a with the transportation vehicle 108a.

During one or more of transportation stages 201a, 201b, 201c, 201d, and 201e of transportation of the requestor 120a, one or both of the provider client device 110a and the requestor client device 116a can transmit signals to the transportation change system 105. For example, the provider client device 110a and the requestor client device 116a can send signals including current locations, speeds, directions, or information regarding interactions with the provider application 112a or the requestor application 118a installed thereon. Alternatively, one or both of the provider client device 110 and the requestor client device 116a can transmit signals to the transportation change system 105 at any point prior to or during transportation regardless of any detected transportation stage.

As described further below, the transportation change system 105 can make destination-restriction determinations at any of the transportation stages 201a-201e. In one or more embodiments, the transportation stage 201a includes an offline stage in which the provider client device 110a is unavailable to accept transportation requests; the transportation stage 201b includes an idling stage in which the provider 114a or the provider client device 110a opens, executes, or initiates the provider application 112a and awaits for a matching transportation request; the transportation stage 201c includes an in-transit stage in which the provider client device 110a or the transportation vehicle 108a travels to a pickup location or destination associated with a transportation request; the transportation stage 201d includes a pickup stage in which the transportation vehicle 108a arrives at the pickup location specified by a transportation request to pick up the requestor 120a; and the transportation stage 201e includes a drop-off stage in which the transportation vehicle 108a arrives at the drop-off location specified by the transportation request (or subsequently updated via a transportation-change request) to drop the requestor 120a off.

In some cases, for example, the provider client device 110a and/or the requestor client device 116a may send signals to the transportation change system 105 at a predetermined transportation stage. Additionally, or alternatively, the provider client device 110a and/or the requestor client device 116a may send signals to the transportation change system 105 after every predetermined distance unit of travel (e.g., every mile), every predetermined time unit (e.g., every 90 seconds), or every time the provider client device 110a or the requestor client device 116a respectively detects an interaction with provider application 112a or the requestor application 118a. For instance, the requestor client device 116a may send signals to the transportation change system 105 upon detecting interactions configuring a transportation-change request via the requestor application 118a installed on the requestor client device 116a.

As suggested above, the transportation change system 105 can detect a transportation stage 201a-201e associated with the transportation occurring in connection with the provider client device 110a and the requestor client device 116a. For example, in at least one embodiment, the transportation change system 105 detects a transportation stage in response to receiving one or more signals from the provider client device 110a and/or the requestor client device 116a. In one or more embodiments, the transportation change system 105 detects the transportation stage as a transportation signal. In other embodiments, the transportation change system 105 can detect the transportation stage by receiving an update (e.g., data packets) from the provider client device 110a identifying a status of the provider application 112a for the provider 114a.

As further suggested above, in some cases, the transportation change system 105 analyzes the signals to identify a transportation-change request associated with the transportation request. For example, in one or more embodiments, the transportation change system 105 can identify a transportation-change request within the signals received from the provider client device 110a or the requestor client device 116a. Alternatively, the transportation change system 105 can receive (and identify within) data indicating a transportation change (including a transportation-change request) from signals transmitted by the provider client device 110a or the requestor client device 116a.

Based on identifying a transportation change from among signals, the transportation change system 105 determines whether to permit or restrict a transportation change associated with the transportation request. For example, after identifying the transportation-change request, the transportation change system 105 can utilize the one or more signals received from the provider client device 110a and the requestor client device 116a to determine whether to restrict or permit changes to a currently specified destination, route, or waypoint associated with the transportation (e.g., locked or made non-changeable).

In one or more embodiments, the transportation change system 105 uses a transportation-change-machine-learning model 202 to make a transportation-restriction determination 206. For example, the transportation change system 105 can generate a signal vector based on received signals and provide the signal vector to the transportation-change-machine-learning model 202. In at least one embodiment and in response to receiving the signal vector, the transportation-change-machine-learning model 202 can output a transportation-restriction metric 204. For example, the transportation change system 105 can generate the transportation-restriction metric 204 in the form of a percentage, a likelihood, or other quantifier indicating whether a requestor has sufficient funding (or will pay) for a transportation change.

As shown in FIG. 2, the transportation change system 105 performs the transportation-restriction determination 206 based on the transportation-restriction metric 204. For example, the transportation change system 105 can restrict a transportation change 208 based on the transportation-restriction metric 204 exceeding or equaling a predetermined threshold. Conversely, the transportation change system 105 can determine to change a transportation 210 (or permit a change to a destination, route, or waypoint) based on the transportation-restriction metric 204 falling below or equaling the predetermined threshold.

As further suggested above, the transportation change system 105 can also generate a restriction notification indicating a restriction preventing a transportation change or a transportation-change notification indicating a change to a destination, route, or waypoint. For example, in response to determining to restrict a transportation change 208, the transportation change system 105 can generate a restriction notification based in part on notification preferences associated with the provider client device 110a. In one or more embodiments, for instance, the restriction notification informs the provider 114a that the destination, route, or waypoint associated with the current transportation may not be altered. In some embodiments, the restriction notification informs the provider 114a that a waypoint may not be added. By contrast, in response to determining to change a transportation 210, the transportation change system 105 can generate a transportation-change notification informing the provider 114a of a new destination, route, or waypoint. Such a transportation-change notification can inform the provider 114a to add a waypoint.

In some embodiments, the transportation change system 105 provides such notifications to the provider client device 110a (and optionally to the requestor client device 116a) based on a safety analysis. For instance, the transportation change system 105 can perform a safety analysis to determine an appropriate time to provide the restriction notification to the provider client device 110a (e.g., so as to not unduly distract the provider 114a while driving). In at least one embodiment, the transportation change system 105 may configure the restriction notification to automatically dismiss after a predetermined amount of time.

As discussed above, in one or more embodiments, the transportation change system 105 can determine to restrict a destination, route, or waypoint associated with a transportation request at various transportation stages associated with transportation of a requestor by a provider (i.e., the provider's vehicle). In accordance with one or more embodiments, FIG. 3 illustrates timelines for the provider client device 110a, the transportation change system 105, and the requestor client device 116a relative to a request for transportation and a change in destination, route, or waypoint. In particular, FIG. 3 depicts transportation stages along a provider timeline 302 for the provider client device 110a and a requestor timeline 306 for the requestor client device 116a. FIG. 3 also depicts actions of the transportation change system 105 along a system timeline 304 corresponding to various transportation stages.

As shown in FIG. 3, the provider timeline 302 includes transportation stages 308a-308i representing different stages of the transportation vehicle 108a and the provider client device 110a before or during transport of a requestor. In the transportation stage 308a, for example, the provider client device 110a notifies the dynamic transportation matching system 104 of an offline status (e.g., through a push or pull communication) in which the provider 114a is unavailable to accept transportation requests. In the transportation stages 308b, 308c, and 308d, the provider client device 110a notifies the dynamic transportation matching system 104 of an idling status for awaiting transportation requests, receives a transportation request, and travels to a pickup location upon accepting the transportation request, respectfully. In the transportation stages 308f, 308g, and 308i, the provider client device 110a notifies the dynamic transportation matching system 104 that the provider 114a picks up the requestor 120a at the pickup location, travels to a destination corresponding to the transportation request, and drops off the requestor 120a, respectfully. In optional transportation stages 308e and 308h, the provider client device 110a optionally changes a destination, route, or waypoint in response to an in-person communication (e.g., a verbal request by a requestor to a provider) or a request from the requestor client device 116a—either before or after pickup.

As further shown in FIG. 3, the requestor timeline 306 includes transportation stages 312a-312i representing different stages of the requestor 120a and the requestor client device 116a before or during transport. In the transportation stage 312a, for example, the requestor client device 116a opens an account for the requestor 120a with the dynamic transportation matching system 104. In the transportation stage 312b (e.g., either as part of the account opening process, or after), the requestor client device 116a identifies a payment card and payment card information (e.g., card type, card number) associated with the account for the requestor 120a. In the transportation stages 312c, 312d, and 312f, the requestor client device 116a sends a transportation request associated with the requestor 120a to the dynamic transportation matching system 104, the requestor 120a awaits pickup by the transportation vehicle 108a, and the transportation vehicle 108a picks up the requestor 120a at the pickup location, respectively. In the transportation stages 312f and 312i, the requestor client device 116a (or the provider client device 110*a*) notifies the transportation change system 105 that the requestor 120*a* or the requestor client device 116*a* has been picked up and/or is traveling to a destination. In optional transportation stages 312*e* (e.g., prior to pick up) and 312*h* (e.g., during transit), the requestor client device 116*a* sends the transportation change system 105 a transportation-change request.

In the provider timeline 302 and the requestor timeline 306, the provider client device 110*a* or the requestor client device 116*a* perform actions prior to receiving or sending a transportation request. For example, in the transportation stage 308*a*, the provider client device 110*a* notifies the dynamic transportation matching system 104 of an offline status. In one or more embodiments, the provider client device 110*a* is offline when the provider application 112*a* is deactivated or has not been used by the provider client device 110*a* for a threshold time period. In the transportation stage 308*b*, the provider client device 110*a* notifies the dynamic transportation matching system 104 of an idling status. In one or more embodiments, the provider client device 110*a* idles while using the provider application 112*a* and notifies the dynamic transportation matching system 104 that the provider 114*a* is available and waiting for a transportation request based on user selections by the provider 114*a*.

As a further example, in the transportation stage 312*a*, the requestor client device 116*a* interacts with a website or the requestor application 118*a* to open an account and send information associated with the requestor 120*a* to the dynamic transportation matching system 104. For example, the requestor client device 116*a* (based on instructions from the requestor application 118*a*) can detect user interactions indicative of an account opening (e.g., entering first time login information, and other registration information). Additionally, or alternatively, the requestor client device 116*a* can detect an activation of the requestor application 118*a*. In at least one embodiment, in the transportation stage 312*b*, the requestor client device 116*a* sends the dynamic transportation matching system 104 payment card information as part of the account opening process. Additionally, or alternatively, the requestor client device can send the dynamic transportation matching system 104 payment card information at any time after account opening and provide information including card type, payment account number, and incremental authorization information for any initial or subsequent payment cards.

In contrast to the provider timeline 302 and the requestor timeline 306, the system timeline 304 includes actions 310*a*-310*d* representing the transportation change system 105 performing actions before, during, or after transport of the requestor 120*a* to a destination. For example, in the action 310*a*, the transportation change system 105 performs an initial preauthorization (and bad actor check) upon matching the transportation request from the requestor client device 116*a* to the provider client device 110*a*. Before pick up or during transit, the transportation change system 105 optionally performs the actions 310*b* and 310*c* for subsequent authorization checks. For example, the transportation change system 105 can perform a subsequent authorization check upon receiving a transportation-change request from the requestor client device 116*a*, detecting a transportation change based on signals from either the provider client device 110*a* or the requestor client device 116*a*, and/or upon receiving notification of a transportation change from the provider client device 110*a*. After drop off (e.g., at the completion of the requestor transportation), the transportation change system 105 performs the action 310*d* of finalizing the costs of the transportation and determining whether a financial institution authorizes or declines a payment charge for transportation corresponding to an initial destination or a transportation change.

When performing the actions 310*a*-310*d* within the system timeline 304, the transportation change system 105 may apply various methods to check for bad actors, preauthorize charges for transportation, or determine authorization for charges for transportation to an initial or new destination. For example, the transportation change system 105 determines a risk of bad actors and communication with a financial institution to preauthorize charges for transportation in response to the dynamic transportation matching system 104 receiving a transportation request from the requestor client device 116*a* (e.g., in transportation stage 312*c*) or the dynamic transportation matching system 104 providing transportation match information to the provider client device 110*a* (e.g., in transportation stage 308*c*). In one or more embodiments, the transportation request includes data such as, but not limited to, an account identifier associated with the requestor client device 116*a* or the requestor 120*a*, the current location of the requestor client device 116*a*, a selected destination, a selected pickup location, and provider preferences (e.g., vehicle type preference, provider rating preference). In at least one embodiment, the transportation change system 105 performs the bad actor check and preauthorization based on signals including, but not limited to, account information and history associated with the requestor client device 116*a* and/or the provider client device 110*a* and payment card information associated with the requestor client device 116*a*.

As further shown in FIG. 3, the transportation change system 105 can perform subsequent authorization checks (e.g., the actions 310*b*, 310*c*) in response to various transportation stages associated with transportation changes. For example, the transportation change system 105 can receive a transportation-change request from the requestor client device 116*a* (e.g., as in transportation stages 312*e*, 312*h*) before or after a pickup (e.g., in transportation stage 312*f*) associated with a transportation match. Similarly, the transportation change system 105 can receive information associated with a transportation change from the provider client device 110*a* (e.g., as in transportation stages 308*e* and 308*h*) before or after a pickup (e.g., in transportation stage 308*f*) associated with the transportation match. In one or more embodiments, receiving information associated with a transportation change from the provider client device 110*a* may be indicative of a verbal exchange between the requestor 120*a* and the 114*a* to arrange a transportation change. Additionally, or alternatively, receiving information associated with a transportation change from the provider client device 110*a* may include GPS information indicating a route departure from a predetermined route to the original destination. In any of these embodiments, the transportation change system 105 may detect a transportation change based on a received transportation-change request, or based on other signals indicative of a transportation change.

In at least one embodiment, the subsequent authorization check (e.g., in actions 310*b*, 310*c*) include the transportation change system 105 performing an incremental payment card authorization, or further bad actor checks on the provider client device 110*a* and/or the requestor client device 116*a*. As mentioned above, the transportation change system 105 can perform the subsequent authorization checks based on signals received from the requestor client device 116*a* and/or the provider client device 110*a*.

In one or more embodiments, the transportation change system 105 can further detect transportation stages 308*i* or 312*i* in response to determining that the requestor 120*a* has been dropped off at a destination by the transportation vehicle 108*a* associated with the provider client device 110*a*. At or after that point, the transportation change system 105 can perform the action 310*d* of processing payment and determining that the charge is authorized or declined. In one or more embodiments, the dynamic transportation matching system 104 finalizes the transportation by charging the payment-card associated with the requestor, funding the provider's dynamic transportation matching system account, and adding information to the dynamic transportation matching system accounts for the requestor 120*a* and the provider 114*a* that reflects the transportation (e.g., length and distance of the transportation, ratings). In some embodiments, the dynamic transportation matching system 104 may perform additional functions relative to the financial institution associated with the payment-card (e.g., chargebacks, concessions, bad actor investigations).

Figure 4:
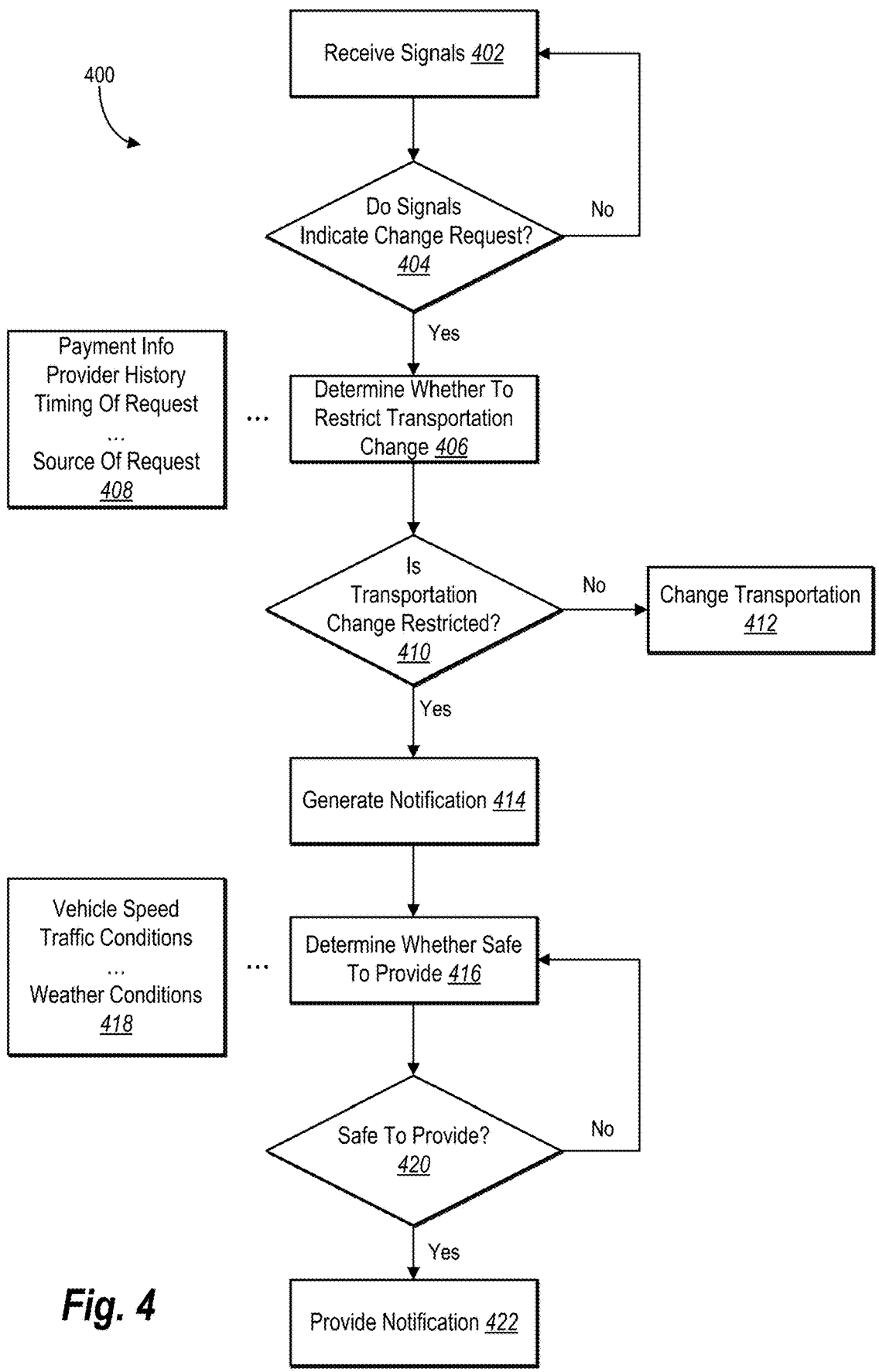
FIG. 4 illustrates a sequence diagram of the transportation change system generating and providing a restriction notification in accordance with one or more embodiments.

As mentioned above, the transportation change system 105 can generate a restriction notification for at least a provider client device. In accordance with one or more embodiments, FIG. 4 illustrates a sequence of acts 400 in which the transportation change system 105 generates and provides a notification indicating a restriction on changing a destination, route, or waypoint for a requestor. As depicted in the sequence of acts 400, for instance, the transportation change system 105 determines whether to restrict a transportation change for a requestor based on analyzing signals received from either or both of a provider client device and a requestor client device. As further depicted in the sequence of acts 400, the transportation change system 105 determines when to provide the notification to the provider client device based on safety factors.

As shown in FIG. 4, the sequence of acts 400 begins with an act 402 of receiving signals from one or more of the provider client device 110*a* and the requestor client device 116*a*. As discussed above, the transportation change system 105 can receive signals at various transportation stages from either or both the provider client device 110*a* and the requestor client device 116*a*. Additionally, or alternatively, the transportation change system 105 can receive signals continuously from either or both the provider client device 110*a* and the requestor client device 116*a* with no regard to (or independent of) transportation stages.

As further shown in FIG. 4, the sequence of acts 400 also includes an act 404 of determining whether the received signals indicate a transportation-change request. As discussed above, a provider client device can send the transportation change system 105 data indicating a provider (and corresponding transportation vehicle) moving through various transportation stages including, but not limited to, an offline stage, an idling stage, an in-transit stage, a pickup stage, or a drop-off stage. In one or more embodiments, the transportation change system 105 can detect a transportation stage by identifying transportation-stage information in the received signals. Additionally, or alternatively, the transportation change system 105 can detect a transportation stage by analyzing the current location of the provider client device 110*a* relative to a route between the pickup location and the drop-off location specified in the transportation request. Additionally, or alternatively, the transportation change system 105 can detect a transportation stage by analyzing a signal indicating the transportation vehicle 108*a* is traveling less than a threshold speed.

Regardless of whether and which transportation stages correspond to a provider (or a corresponding transportation vehicle), the transportation change system 105 can determine whether the received signals indicate a transportation-change request in several ways. For example, the transportation change system 105 can determine that the received signals include a transportation-change request by identifying the transportation-change request within the received signals. Additionally, or alternatively, the transportation change system 105 can determine that the received signals include a transportation-change request by analyzing the signals for interaction information relative to applications installed on the provider client device 110*a* and/or the requestor client device 116*a* indicating a transportation-change request (e.g., a selection to edit a transportation request or a selection to modify a destination or waypoint). Additionally, or alternatively, the transportation change system 105 can determine that the received signals indicate a transportation-change request by identifying a deviation of the transportation vehicle 108*a* from a predetermined route associated with the current transportation. Additionally, or alternatively, the transportation change system 105 can determine that the received signals indicate a transportation-change request by determining that the transportation vehicle 108*a* is traveling at less than a threshold speed (e.g., indicating a potential drop off).

In response to determining that the signals do not include a transportation-change request (e.g., "No"), the transportation change system 105 can again perform the act 402 of receiving signals from either the provider client device 110*a* or the requestor client device 116*a*. By contrast, in response to determining that the signals indicate a transportation-change request (e.g., "Yes"), the transportation change system 105 can perform the act 406 of determining whether to restrict the transportation associated with the transportation request (e.g., "lock" the destination so that it cannot be changed).

As mentioned above, in one or more embodiments, the transportation change system 105 can determine whether to restrict a destination, route, or waypoint associated with the transportation request based on signals 408. For example, as discussed above, the signals 408 can include, but are not limited to, (i) a speed and direction of travel associated with the transportation vehicle 108*a*, (ii) the transportation stage associated with the transportation, (iii) payment-card information associated with the payment card corresponding to the transportation request, (iv) a transportation history associated with the provider 114*a* or the provider client device 110*a*, (v) a number of previous requests for transportation associated with an account of the requestor, (vi) an account-opening time for opening the account of the requestor relative to a requesting time for current transportation request, (vii) the requesting time for the transportation request relative to a change-request time for the transportation-change request (e.g., just prior to pick-up, during pick-up, just after pick-up, during transportation), and/or (viii) a source of the transportation-change request. In at least one embodiment, and as discussed with regard to FIGS. 5A-5B, the transportation change system 105 can make a restriction determination utilizing the signals 408 in connection with a trained transportation-change-machine-learning model.

To further illustrate, the signal (iii) for payment-card information associated with the payment card can include, but is not limited to, the payment-card type, the associated payment processor, the incremental processing stage associated payment, and prior approval issued to the payment-car. Additionally, the signal (iv) for the transportation history associated with the provider 114a or the provider client device 110a can include, but is not limited to, length of service associated with the provider 114a relative to the dynamic transportation matching system 104, average rating associated with the provider 114a relative to the dynamic transportation matching system 104, and information associated with transportation provided by the provider 114a in the past (e.g., length, distance, rating, payment).

Additionally, as mentioned above, some of the signals 408 are associated with the requestor 120a. For example, the signal (v) for a number of previous requests for transportation associated with an account of the requestor can include a number of previous transportation-change requests made by the requestor 120a and/or a number of previous transportation-change requests made by the requestor 120a that were granted or declined. In at least one embodiment, a high number of previously granted transportation-change requests made by the requestor 120a can indicate that the transportation change system 105 should grant the present change request.

Further, the signal (vi) for an account-opening time for opening the account of the requestor relative to a requesting time for a current transportation request can include a number of minutes and/or days in the period of time from when the requestor 120a opened an account to when the requestor 120a submitted the present transportation-change request. In at least one embodiment, a low number of minutes and/or days may indicate that the transportation change system 105 should not grant the present change request. The signal (vii) for the requesting time for the transportation request relative to a change-request time for the transportation-change request can include a difference (e.g., in minutes) between the time of pickup (e.g., when the requestor 120a gets into the transportation vehicle 108a) to the time the transportation-change request is received by the transportation change system 105. In at least one embodiment, a pattern of a relatively small difference in time may be indicative that the transportation change system 105 should deny the transportation-change request.

In one or more embodiments, the transportation change system 105 utilizes the signals 408 and other information associated with the transportation request (e.g., the cost associated with transportation from the pickup location to the original destination) to determine whether a change in destination, route, or waypoint would result in a price increase associated with the transportation request. In at least one embodiment, the transportation change system 105 determines that the destination is not restricted in the act 406 in response to determining that a the change in destination, route, or waypoint would not result in a price increase. Alternatively, the transportation change system 105 can determine whether to restrict a destination for a requestor in response to determining a change in destination, route, or waypoint would result in a price increase.

As further shown in FIG. 4, based on the determination in the act 406, the transportation change system 105 can determine that the transportation change is not restricted in the act 410 (e.g., "No"). In response to determining that the transportation change is not restricted, the transportation change system 105 performs the act 412 of changing the destination, route, or waypoint associated with the transportation request. For example, the transportation change system 105 can update any file or storage node associated with the transportation request between the provider client device 110a and the requestor client device 116a to indicate the destination, route, or waypoint specified in the transportation-change request. The dynamic transportation matching system 104 can further update route guidance for the provider client device 110a to reflect the new destination, route, or waypoint.

If the transportation change system 105 determines that the transportation change is restricted in the act 410 (e.g., "Yes"), the transportation change system 105 performs the act 414 of generating a restriction notification. As mentioned above, the transportation change system 105 can generate and provide restriction notifications to provider client devices and/or requestor client devices. For example, in one or more embodiments, the transportation change system 105 can generate a restriction notification based on preferences of the provider client device 110a. Specifically, based on the display preferences of the provider client device 110a, the transportation change system 105 can generate the restriction notification to be a pop-up message, a banner notification, a partial screen overlay, a full-screen notification, an auditory notification, or any other type of notification. Additionally, the transportation change system 105 can configure the restriction notification to display on the provider client device 110a for a predetermined amount of time before automatically dismissing from display. The transportation change system 105 can generate the restriction notification to include a statement informing the provider that the transportation change is restricted (e.g., "The destination associated with this ride cannot be changed.").

In one or more embodiments, the transportation change system 105 further performs the act 416 of determining whether it is safe to provide the restriction notification to the provider client device 110a. For example, to avoid distracting the provider 114a while the provider 114a operates the transportation vehicle 108a, the transportation change system 105 may provide the generated restriction notification based on a safety analysis. The transportation change system 105 may perform the safety analysis based on safety factors 418. Such safety factors include, but are not limited to, (i) a detected position of the transportation vehicle 108a (e.g., stopped at a red light or stop sign), (ii) a detected speed of the transportation vehicle 108a, including reference to a threshold speed (e.g., less than eight miles per hour), (iii) a detected transportation stage of the transportation vehicle 108a (e.g., the idling stage), (iv) traffic conditions around the transportation vehicle 108a, and/or (v) weather conditions in the geographic area where the transportation vehicle 108a is located.

To further illustrate, the transportation change system 105 may provide a restriction notification in response to determining that the transportation vehicle 108a is located in a low-speed area (e.g., parked in a parking lot), but may not provide the restriction notification in response to determining that the transportation vehicle 108a is located in a high-speed area (e.g., on a highway). Similarly, the transportation change system 105 may provide the restriction notification in response to determining that the transportation vehicle 108a is traveling at a speed that is the same as or less than a speed threshold for sending notifications (e.g., 10 miles per hour, 55 miles per hour). But the transportation change system 105 may not provide the restriction notification in response to determining that the transportation vehicle 108a is traveling at a speed higher than the speed threshold.

Additionally, the transportation change system 105 may provide the restriction notification at select transportation stages, such as the pickup stage, but not at other transportation stages, such as an in-transit stage for traveling to a pickup location. Furthermore, the transportation change system 105 may provide the restriction notification in response to determining that traffic conditions at the current location of the transportation vehicle 108a are favorable (e.g., light), but not in response to determining that traffic conditions at the current location of the transportation vehicle 108a are poor (e.g., heavy). Moreover, the transportation change system 105 may provide the restriction notification in response to determining that weather conditions in the geographic area where the transportation vehicle 108a is located are fair (e.g., sunny, clear). The transportation change system 105 may not provide the restriction notification in response to determining that weather conditions in the geographic area where the transportation vehicle 108a is located are poor (e.g., rainy, snowy, foggy).

In at least one embodiment, the transportation change system 105 can perform a rule-based safety analysis. For example, the transportation change system 105 may determine that it is not safe to provide the restriction notification if the transportation vehicle 108a is traveling faster than ten miles per hour. In another example, the transportation change system 105 may determine that it is not safe to provide the generated restriction notification if the transportation vehicle 108a is currently located in the midst of heavy traffic.

In an additional or alternative embodiment, the transportation change system 105 can perform the safety analysis utilizing a machine-learning model. For example, the transportation change system 105 can utilize the safety factors 418 to generate a signal vector for a trained safety-machine-learning model that is trained to output a safety determination. In that embodiment, the safety-machine-learning model can take into account all relevant safety factors 418, rather than basing a safety determination on a single safety condition (e.g., as with the rule-based approach described above).

In response to determining that the transportation vehicle 108a is in a safe condition in act 420 (e.g., "Yes"), the transportation change system 105 performs the act 422 of providing the restriction notification to at least the provider client device 110a. For example, the transportation change system 105 can provide the restriction notification to the provider client device 110a to cause the provider client device 110a to display the restriction notification within a graphical user interface based on executing instructions from the provider application 112a. As mentioned above, the transportation change system 105 can generate the restriction notification to automatically dismiss after a predetermined amount of time.

In response to determining that the transportation vehicle 108a is not in a safe condition to provide the restriction notification in the act 420 (e.g., "No"), the transportation change system 105 can again perform the act 416 of determining whether it is safe to provide the restriction notification. In one or more embodiments, the transportation change system 105 can repeatedly perform the safety determination in the act 416 until determining conditions are safe to provide the restriction notification.

Figure 5A:
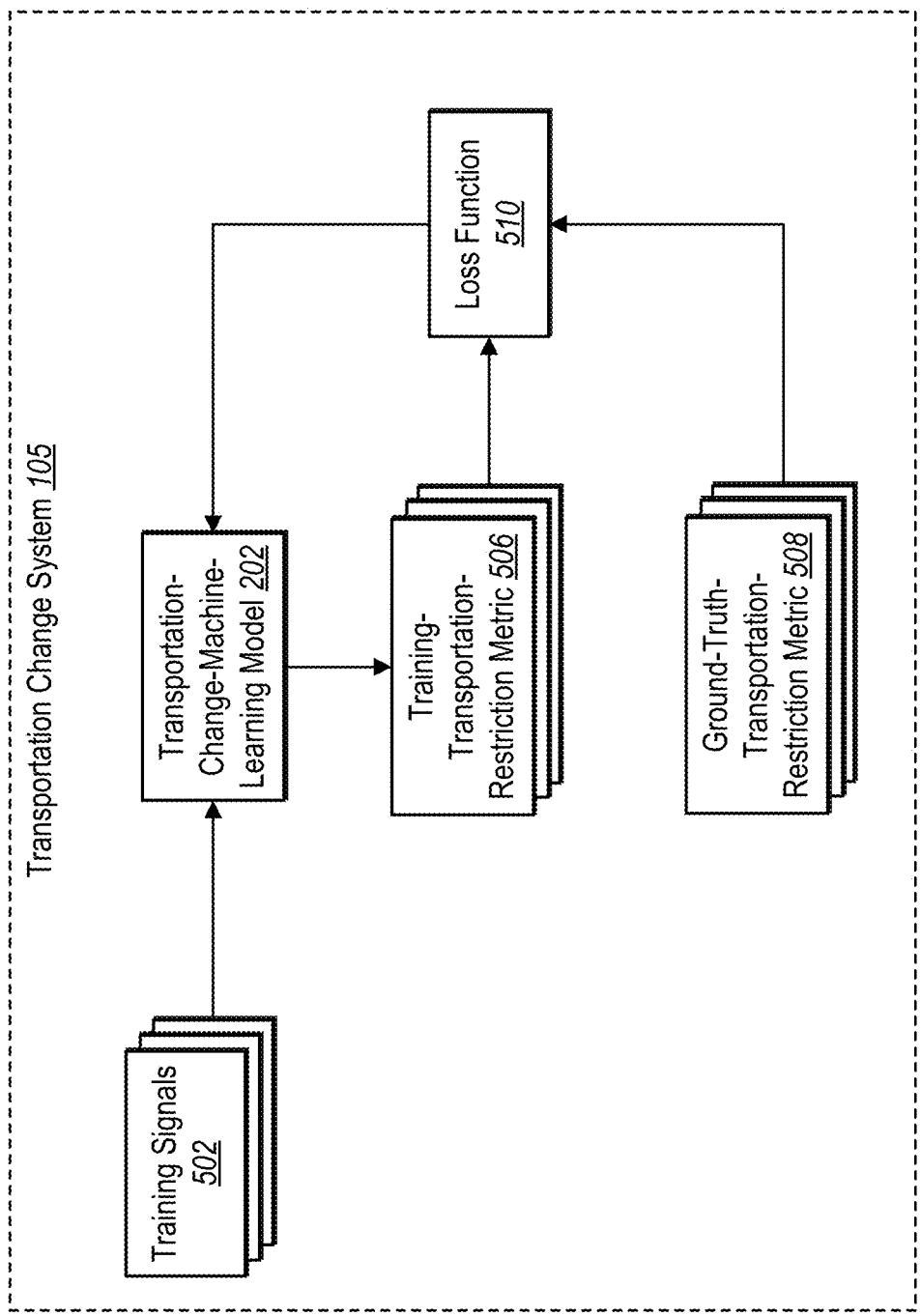
FIG. 5A illustrates the transportation change system training a transportation-change-machine-learning model in accordance with one or more embodiments.

As discussed above, the transportation change system 105 can train and utilize a transportation-change-machine-learning model to generate transportation-restriction metrics as a basis for determining whether to restrict a destination, route, or waypoint for a transportation request. For instance, FIG. 5A illustrates training the transportation-change-machine-learning model 202 in accordance with one or more embodiments. As shown in FIG. 5A, the transportation change system 105 identifies training signals 502 and corresponding ground-truth-transportation-restriction metrics 508. In one or more embodiments, the transportation change system 105 trains the transportation-change-machine-learning model 202 by generating a training-transportation-restriction metric 506 based on a training signal vector representing a subset of training signals, comparing the training-transportation-restriction metric 506 to a ground-truth-transportation-restriction metric 508 corresponding to the subset of training signals, and modifying parameters of the transportation-change-machine-learning model 202 based on the comparison. This process will now be described in greater detail.

As shown in FIG. 5A, the training signals 502 includes historical training signal data. In one or more embodiments, the training signals 502 include instances of historical data associated with previously received, matched, and completed transportation requests that may or may not have included transportation-change requests. For example, one or more of the training signals 502 may include information associated with a previously received transportation request including, but not limited to: requestor information (e.g., rating, dynamic transportation matching system history, preferences), provider information (e.g., rating, dynamic transportation matching system history, preferences), pickup location information (e.g., average provider wait times associated with a particular pickup location), change request information (e.g., whether a change request was received and whether the change request was granted) and fulfillment information (e.g., whether the transportation request was successfully completed, how long it took, how much it cost). The training signals 502 may include any type of signal described above or below.

As indicated above, the transportation change system 105 generates a training-transportation-restriction metric based on a training signal vector representing a subset of training signals. For example, a training-transportation-restriction metric may include a probability that the requestor has sufficient funding to pay for transportation including the requested destination, route, or waypoint from a transportation-change request (e.g., 75% likely). In another embodiment, the training-transportation-restriction metric may include a score indicating that a destination, route, or waypoint should be restricted (e.g., 90 out of 100 should be restricted, 18 out of 100 should not be restricted). By contrast, in some embodiments, a training-transportation-restriction metric may comprise a binary indicator of whether to restrict or permit a change in transportation. Alternatively, in these and other embodiments, the transportation change system 105 can make a final restriction determination (e.g., "0" means do not restrict, "1" means restrict) by comparing the training-transportation-restriction metric to a predetermined threshold (e.g., a predetermined likelihood probability, a predetermined score).

Each subset of the training signals 502 corresponds to a ground-truth-transportation-restriction metric. For example, every previously received transportation request within the training signal data corresponds to a ground-truth-transportation-restriction metric that includes a ground truth associated with the received transportation request including the training signal data. For example, if a previously received transportation request includes a successfully granted transportation-change request, the associated ground-truth-transportation-restriction metric may include a binary decision (e.g., "0") indicating that the destination, route, or waypoint should not be restricted or that the requestor has sufficient funds to pay for the updated transportation including the new destination, route, or waypoint. In another example, if a previously received transportation request includes a transportation-change request that was not granted, the associated ground-truth-transportation-restriction metric may include a score (e.g., 95 out of 100) indicating that the destination, route, or waypoint should be restricted or that the requestor does not have sufficient funds to pay for the updated transportation including the new destination, route, or waypoint.

In an initial training iteration of the transportation-change-machine-learning model 202, for instance, the transportation change system 105 provides a subset of the training signals 502 to the transportation-change-machine-learning model 202. In one or more embodiments, the transportation-change-machine-learning model 202 may include the functionality to generate a training signal vector from received signal training data. For example, in some embodiments, the transportation change system 105 generates a multi-dimensional vector comprising values representing each signal from a subset of training signals. In other embodiments, the transportation change system 105 generates a training signal vector comprising character strings associated with each signal from a subset of training signals. Accordingly, in response to receiving the one or more training signals 502, the transportation-change-machine-learning model 202 may generate a training signal vector and pass the generated training signal vector to an input layer of the transportation-change-machine-learning model 202.

Continuing the initial training iteration, the transportation-change-machine-learning model 202 outputs the training-transportation-restriction metric 506 based on the subset of the training signals 502. Depending on the structure of the transportation-change-machine-learning model 202, the transportation-change-machine-learning model 202 may process the training signal vector in a number of ways. For example, in one embodiment, the transportation-change-machine-learning model 202 may pass latent feature vectors between sequential processing layers of the transportation-change-machine-learning model 202. Additionally, the transportation-change-machine-learning model 202 may pool prediction results (e.g., in a max pooling layer), and generate the training-transportation-restriction metric 506.

After generating the training-transportation-restriction metric 506 in the initial training iteration, the transportation change system 105 compares the training-transportation-restriction metric 506 to the ground-truth-transportation-restriction metric 508 to determine a loss using a loss function 510. As shown in FIG. 5A, the loss function 510 can include, but is not limited to, a regression loss function (e.g., a mean square error function, a quadratic loss function, an L2 loss function, a mean absolute error/L1 loss function, mean bias error). Additionally, or alternatively, the loss function 510 can include a classification loss function (e.g., a hinge loss/multi-class SVM loss function, cross entropy loss/negative log likelihood function).

Further, the loss function 510 can return quantifiable data regarding the difference between the training signals 502 and the ground-truth-transportation-restriction metric 508. In particular, the loss function 510 can return such loss data to the transportation-change-machine-learning model 202 such that the transportation change system 105 can adjust various parameters/hyperparameters to improve the quality/accuracy of training-transportation-restriction metrics in subsequent training iterations—by narrowing the difference between training-transportation-restriction metrics and ground-truth-transportation-restriction metrics.

In some embodiments, the loss function 510 can include an Adam optimizer for intelligently adjusting weights and various parameters/hyperparameters within the transportation-change-machine-learning model 202. Moreover, the training of the transportation-change-machine-learning model 202 can be an iterative process (as shown by the return arrow between the loss function 510 and the transportation-change-machine-learning model 202) such that the transportation change system 105 continually adjusts parameters/hyperparameters of the transportation-change-machine-learning model 202 over training iterations.

After modifying parameters of the transportation-change-machine-learning model 202 for an initial training iteration, in certain implementations, the transportation change system 105 performs additional training iterations. In a subsequent training iteration, for instance, the transportation change system 105 generates subsequent training-transportation-restriction metrics based on a different subsets of training signals. The transportation change system 105 further compares the subsequent training-transportation-restriction metrics to subsequent ground-truth-transportation-restriction metrics using the loss function 510 and modifies parameters of the transportation-change-machine-learning model 202 based on a determined loss.

By iteratively determining losses from a comparison of training-transportation-restriction metrics and ground-truth-transportation-restriction metrics, the transportation change system 105 trains the transportation-change-machine-learning model 202 to generate transportation-restriction metrics. In some cases, the transportation change system 105 performs training iterations until the parameters (e.g., values or weights) of the transportation-change-machine-learning model 202 do not change significantly across training iterations or otherwise satisfy a convergence criteria.

Figure 5B:
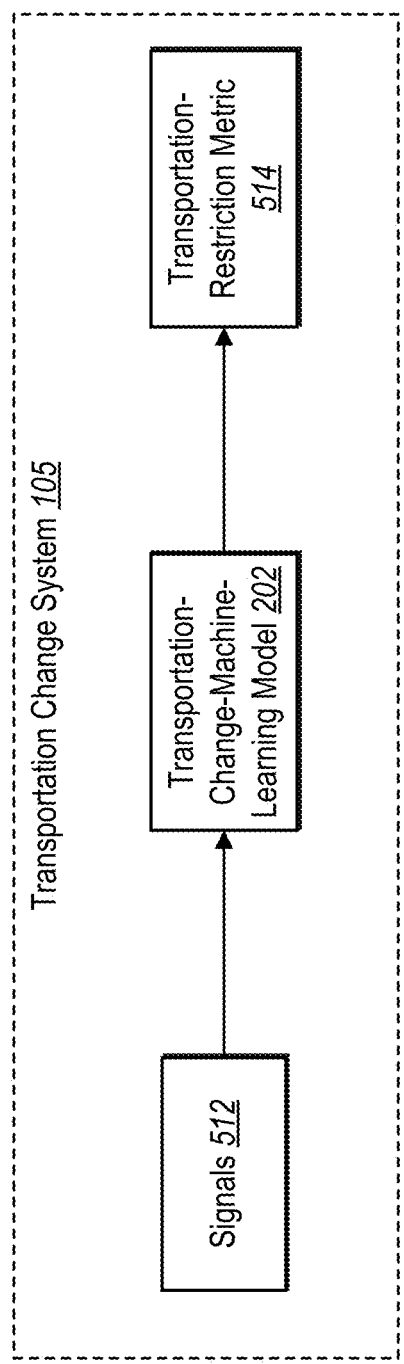
FIG. 5B illustrates the transportation change system generating a transportation-restriction metric utilizing the trained transportation-change-machine-learning model in accordance with one or more embodiments.

After training the transportation-change-machine-learning model 202, in some embodiments, the transportation change system 105 applies a trained version of the transportation-change-machine-learning model 202. In accordance with one or more embodiments, FIG. 5B illustrates the transportation change system 105 applying the transportation-change-machine-learning model 202 to generate a transportation-restriction metric 514 based on signals 512. As indicated above, one or more of the signals 512 can indicate a transportation change or a transportation-change request. Similarly, the signals 512 may include any of the example signals discussed above. In response to receiving the signals 512, the transportation-change-machine-learning model 202 generates a signal vector based on the signals 512 and processes the signal vector.

In one or more embodiments, the transportation-change-machine-learning model 202 outputs the transportation-restriction metric 514. For example, the transportation-change-machine-learning model 202 can output the transportation-restriction metric 514 as a binary determination. For example, the transportation-change-machine-learning model 202 may output a "0" to indicate that the destination, route, or waypoint associated with the transportation should not be restricted or a "1" to indicate that the destination, route, or waypoint associated with the transportation should be restricted. Additionally, or alternatively, the transportation-change-machine-learning model 202 can output the transportation-restriction metric 514 as a likelihood percentage (e.g., 75% likely that the destination, route, or waypoint associated with the transportation should be restricted). In that embodiment, the transportation change system 105 may determine to restrict the destination, route, or waypoint with the transportation-restriction metric 514 is above a threshold amount (e.g., above 80% likely).

As mentioned above, the transportation change system 105 can dynamically provide a restriction notification to at least the provider client device 110a to indicate that a destination associated with a current transportation is restricted from being changed. In accordance with one or more embodiments, FIGS. 6A-6E illustrate the provider client device 110a presenting graphical user interfaces 604a-604e. As explained below, the transportation change system 105 provides a restriction notification to the provider client device 110a in response to various signals associated with a transportation of a requestor.

FIGS. 6A-6E likewise each depict the provider client device 110a comprising a provider application for the dynamic transportation matching system 104. In some embodiments, the provider application comprises computer-executable instructions that cause the provider client device 110a to perform certain actions depicted in FIGS. 6A-6E, such as presenting a graphical user interface of the provider application. Rather than refer to the dynamic transportation matching system 104 or the transportation change system 105 as performing the actions depicted in FIGS. 6A-6E below, this disclosure will generally refer to the provider client device 110a for simplicity.

As shown in FIGS. 6A-6E, the transportation change system 105 can generate and provide different types of restriction notifications. In one or more embodiments, the transportation change system 105 can generate a restriction notification based on display preferences associated with the provider client device 110a. Additionally, the transportation change system 105 can provide a restriction notification at different stages of an active transportation and/or based on various safety factors associated with the active transportation.

Figure 6B:
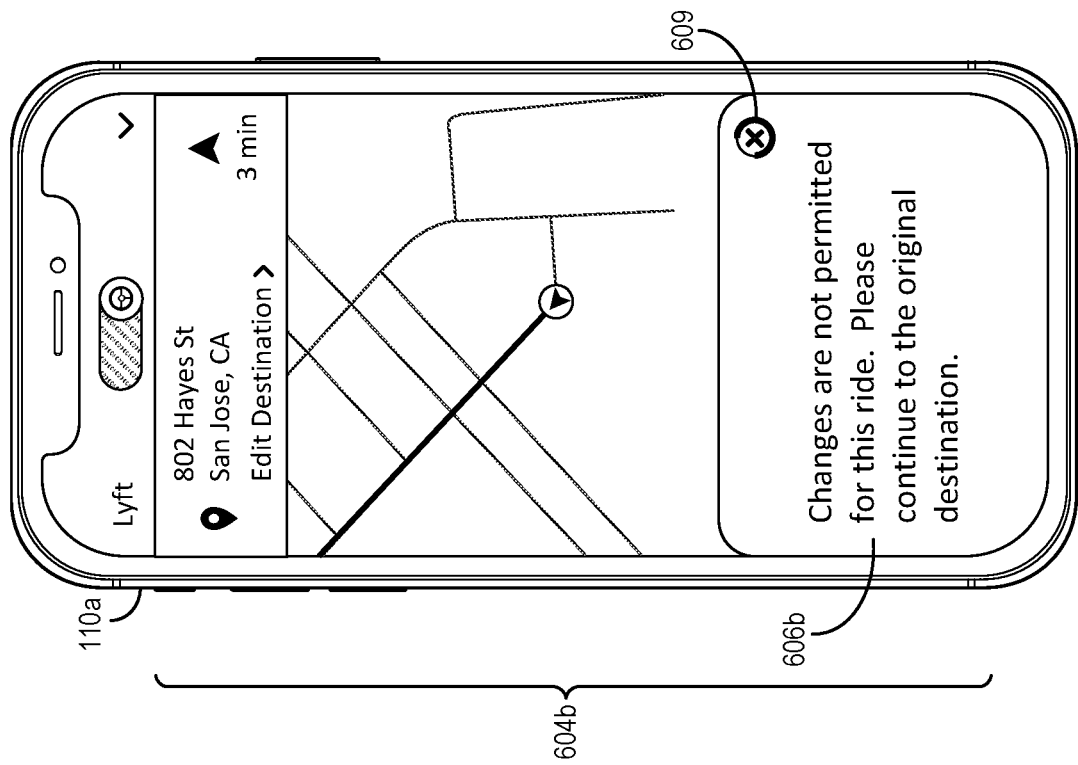
FIGS. 6A-6E illustrate example graphical user interfaces generated by the transportation change system in accordance with one or more embodiments.
Figure 6A:
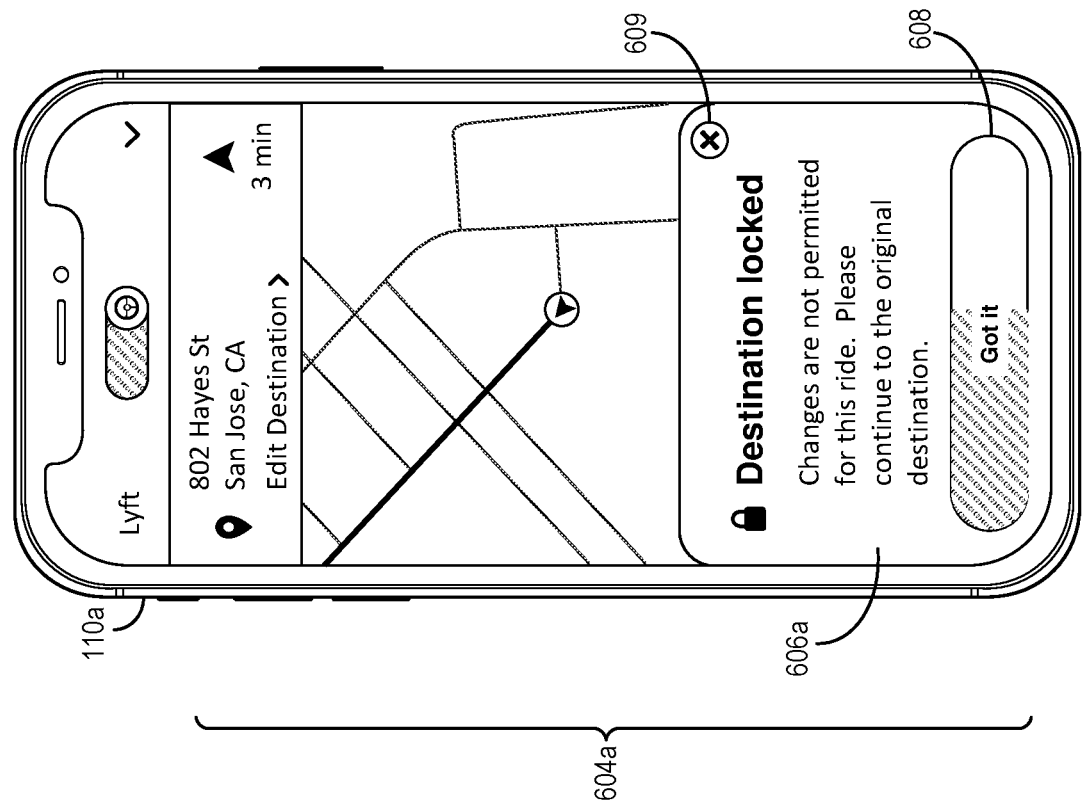

As shown in FIG. 6A, for example, the transportation change system 105 generates and provides the restriction notification 606a as an overlay on a navigation map within a graphical user interface 604a. In one or more embodiments, the dynamic transportation matching system 104 provides updates to the graphical user interface 604a during an active transportation to show progress of the transportation vehicle 108a along a route to a destination specified in a corresponding transportation request. In at least one embodiment, the transportation change system 105 generates the restriction notification 606a to include a statement informing the provider 114a that the destination is locked and cannot be changed. Alternatively, a restriction notification may include a statement informing the provider 114a that a route or waypoint is locked and cannot be changed.

As further shown in FIG. 6A, the transportation change system 105 generates the restriction notification 606a to include various dismissal options. For example, the transportation change system 105 can generate the restriction notification 606a to include a restriction-confirmation button 608 (e.g., with "Got it" shown in FIG. 6A). In one or more embodiments, the transportation change system 105 can continually update the restriction-confirmation button 608 to progressively change color as a way of counting down to an automatic dismissal (e.g., after 10 seconds). Alternatively, in response to a detected selection of the restriction-confirmation button 608, the transportation change system 105 can immediately dismiss the restriction notification 606a so that it is no longer displayed. Additionally or alternatively, the transportation change system 105 can also generate the restriction notification 606a to include an exit button 609. In response to a detected selection of the exit button 609, the transportation change system 105 can dismiss the restriction notification 606a.

In alternative embodiments, as shown in FIG. 6B, the transportation change system 105 can generate the restriction notification 606b for display within the graphical user interface 604b. The restriction notification 606b includes a simpler statement (e.g., in plain text with no bolds, icons, or highlights) and the exit button 609. In one or more embodiments, as shown in FIG. 6B, the transportation change system 105 can incorporate a count-down feature into the exit button 609. For example, the transportation change system 105 can cause an outer ring to become progressively more or less bold (e.g., as with a clock ticking down) in order to illustrate an amount of time before the transportation change system 105 automatically dismisses the restriction notification 606b.

Figures 6C, 6D:
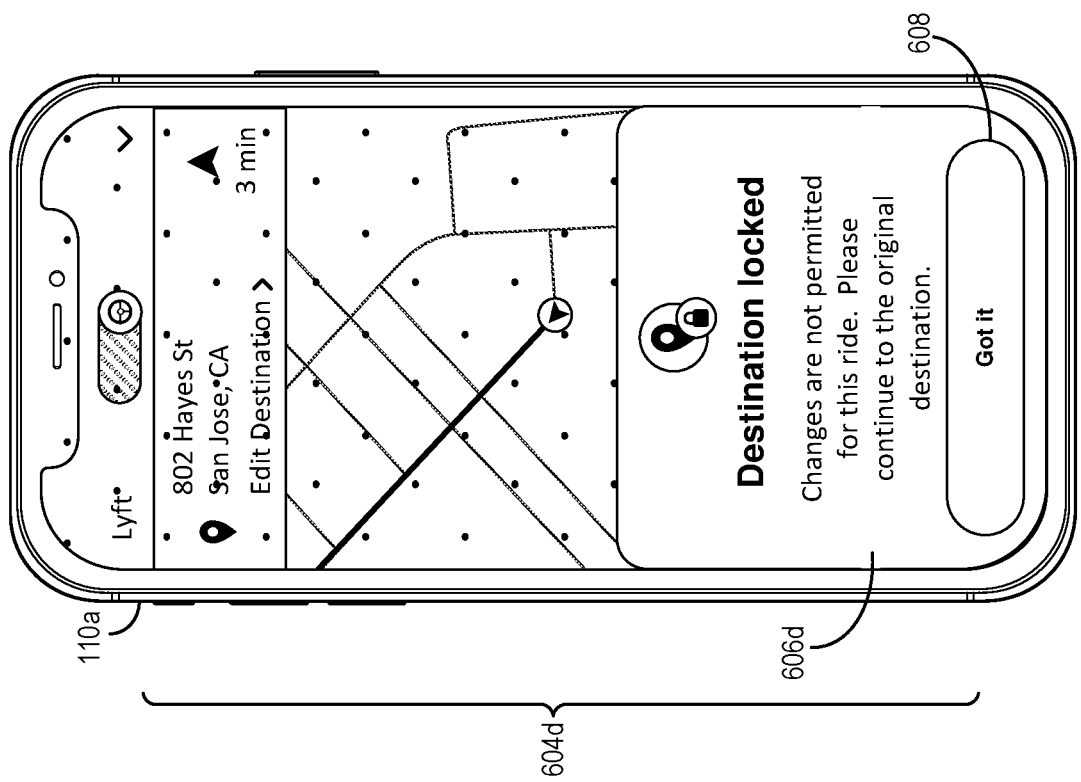

In other embodiments, the transportation change system 105 can generate a restriction notification to be smaller or differently overlaid within a graphical user interface. For example, as shown in FIG. 6C, the transportation change system 105 generates the restriction notification 606c for display within the graphical user interface 604c. The restriction notification 606c is relatively smaller than previous restriction notifications and overlaid over a top portion of the graphical user interface 604c. As further shown in FIG. 6C, the transportation change system 105 can generate the restriction notification 606c to include a simple statement (e.g., "No destination change," "No waypoint change," "No route change"), and to not include a dismissal or exit button. Instead of a dismissal or exit button, the transportation change system 105 can generate the restriction notification 606c to dismiss in response to any user interaction anywhere on the graphical user interface 604c.

In one or more embodiments, the transportation change system 105 can cause the provider client device 110a to lock a map or blur or obscure a map in a graphical user interface in response to overlaying a restriction notification on the map or other portion of the graphical user interface. For example, as shown in FIG. 6D, the transportation change system 105 causes the provider client device 110a to lock a navigation map within the graphical user interface 604d (e.g., indicated by graying-out) while the restriction notification 606d is overlaid on the navigation map. Additionally, as shown in FIG. 6D, the transportation change system 105 can keep the restriction notification 606d overlaid on the navigation map indefinitely until detecting an interaction with the restriction-confirmation button 608.

Figure 6E:
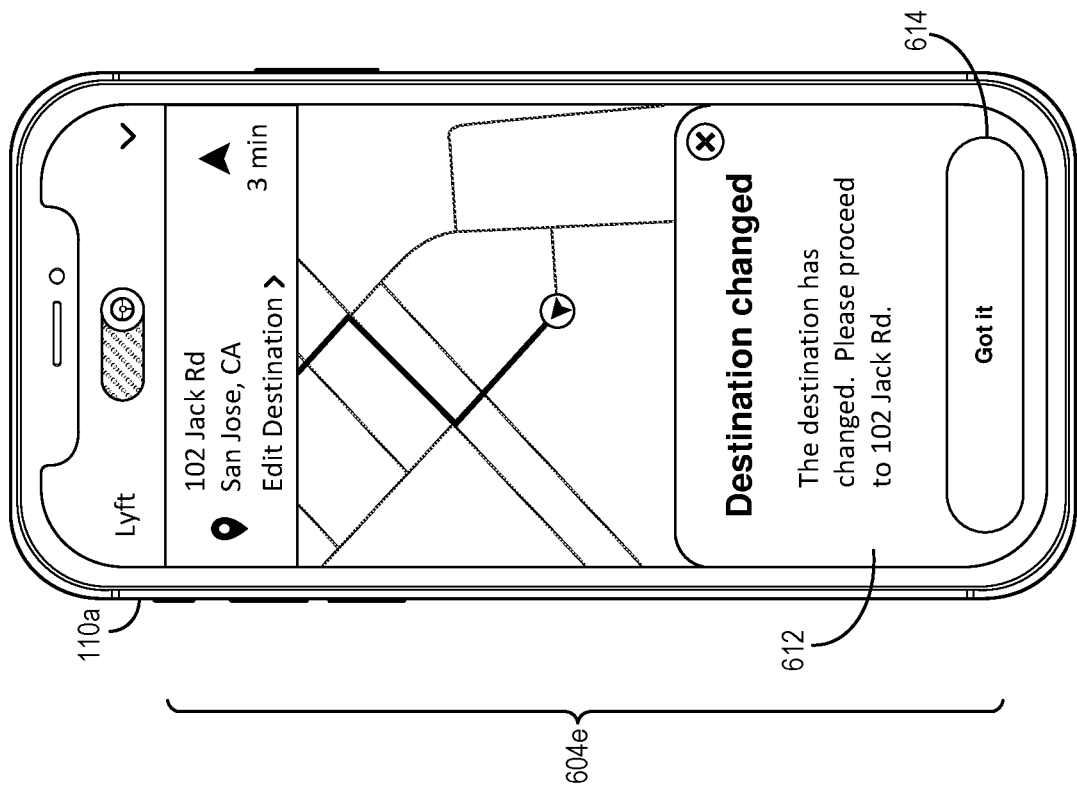

In one or more embodiments, the transportation change system 105 can also provide change notifications in connection with transportation changes. For example, as shown in FIG. 6E, in response to permit a transportation change or grant a transportation-change request and changing a destination, route, or waypoint associated with a transportation request, the transportation change system 105 can generate and provide a transportation-change notification 612 overlaid on a portion of a graphical user interface 604e. The transportation change system 105 can generate the transportation-change notification 612 to include information regarding the transportation change and a change-confirmation button 614 that (upon selection) confirms a change of destination.

Figure 7:
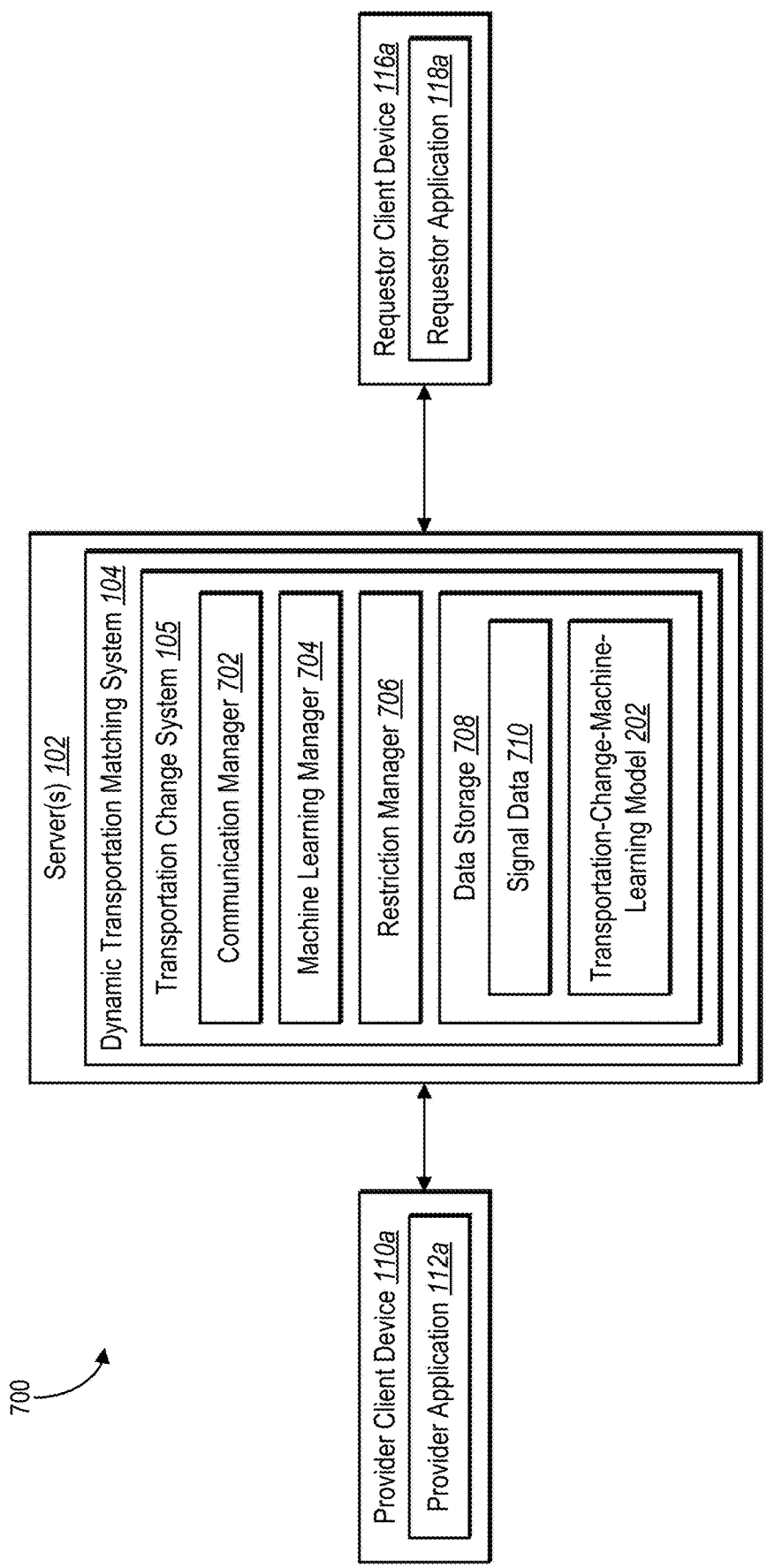
FIG. 7 illustrates a schematic diagram of the transportation change system in accordance with one or more embodiments.

Turning now to FIG. 7, additional detail is provided regarding a computing system 700, including components and capabilities of the transportation change system 105 in accordance with one or more embodiments. As shown, the transportation change system 105 is implemented by the server(s) 102, including the dynamic transportation matching system 104. In some embodiments, the components of the transportation change system 105 can be implemented by a single device (e.g., the server(s) 102, the requestor client device 116a, the provider client device 110a) or multiple devices. As shown, the transportation change system 105 includes a communication manager 702, a machine learning manager 704, a restriction manager 706, and a data storage 708 including signal data 710 and the transportation-change-machine-learning model 202. Each is discussed in turn below.

As just mentioned, and as shown in FIG. 7, the transportation change system 105 includes the communication manager 702. In one or more embodiments, the communication manager 702 handles all communications between the transportation change system 105, the requestor client device 116*a*, and the provider client device 110*a*. For example, the communication manager 702 receives signals from the provider client device 110*a* and the requestor client device 116*a*, and sends restriction notifications to the provider client device 110*a* and the requestor client device 116*a*. Additionally, the communication manager 702 can also handle communications between the transportation change system 105 and the dynamic transportation matching system 104. For example, the communication manager 702 can communicate transportation changes that have been granted to the dynamic transportation matching system 104. The communication manager 702 can also retrieve information associated with the provider client device 110*a* and/or the requestor client device 116*a* (e.g., account information and histories) for use in making restriction determinations.

As mentioned above, and as shown in FIG. 7, the transportation change system 105 also includes the machine learning manager 704. In one or more embodiments, the machine learning manager 704 trains and implements one or more machine learning models (e.g., such as the transportation-change-machine-learning model 202). For example, the machine learning manager 704 can manage and utilize training data (e.g., training signals and ground-truth-transportation-restriction metrics) to train the transportation-change-machine-learning model 202. The machine learning manager 704 can also generate a signal vector based on signals received from the provider client device 110*a* and/or the requestor client device 116*a*. Furthermore, the machine learning manager 704 can apply the trained transportation-change-machine-learning model 202 to an input signal vector to generate a transportation-restriction metric for use in determining whether to restrict a destination associated with a transportation request.

As further mentioned above, and shown in FIG. 7, the transportation change system 105 includes the restriction manager 706. In one or more embodiments, the restriction manager 706 determines whether to restrict a destination associated with a transportation request based on a transportation-restriction metric generated by the transportation-change-machine-learning model 202, as described above. For example, the restriction manager 706 can determine to restrict a transportation by comparing the transportation-restriction metric to a predetermined threshold. Additionally, or alternatively, the restriction manager 706 can dynamically determine the threshold based on an analysis of an account associated with the requestor client device 116*a* and/or the provider client device 110*a*. For instance, if the transportation change system 105 associates the requestor 120*a* or the requestor client device 116*a* with opportunistic actions in the past, the restriction manager 706 may compare the transportation-restriction metric to a higher threshold than if the requestor 120*a* or the requestor client device 116*a* had no prior suspicious activity.

Additionally, the restriction manager 706 can generate restriction notifications in response to determining that a destination associated with a transportation request should be restricted. For example, the restriction manager 706 can generate restriction notifications, such as illustrated above in FIGS. 6A-6D, based on client device display preferences. The restriction manager 706 can also perform the safety analysis described above to provide the restriction notification to the provider client device 110*a* and/or the requestor client device 116*a* in a safe manner.

The transportation change system 105 also includes the data storage 708. In one or more embodiments, the data storage 708 includes the signal data 710. For example, the signal data 710 can include transportation signal information, such as described herein. Additionally, the data storage 708 can include the transportation-change-machine-learning model 202.

Each of the components of the computing system 700 can include software, hardware, or both. For example, the components of the computing system 700 can include one or more instructions stored on a computer-readable storage medium and executable by processors of one or more computing devices, such as a client device or a server device. When executed by the one or more processors, the computer-executable instructions of the transportation change system 105 can cause the computing device(s) (e.g., the server(s) 102) to perform the methods described herein. Alternatively, the components of the computing system 700 can include hardware, such as a special-purpose processing device to perform a certain function or group of functions. Alternatively, the components of the computing system 700 can include a combination of computer-executable instructions and hardware.

Furthermore, the components of the computing system 700 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing system 700 may be implemented as a stand-alone application, such as a desktop or mobile application. Furthermore, the components of the computing system 700 may be implemented as one or more web-based applications hosted on a remote server.

Figure 8:
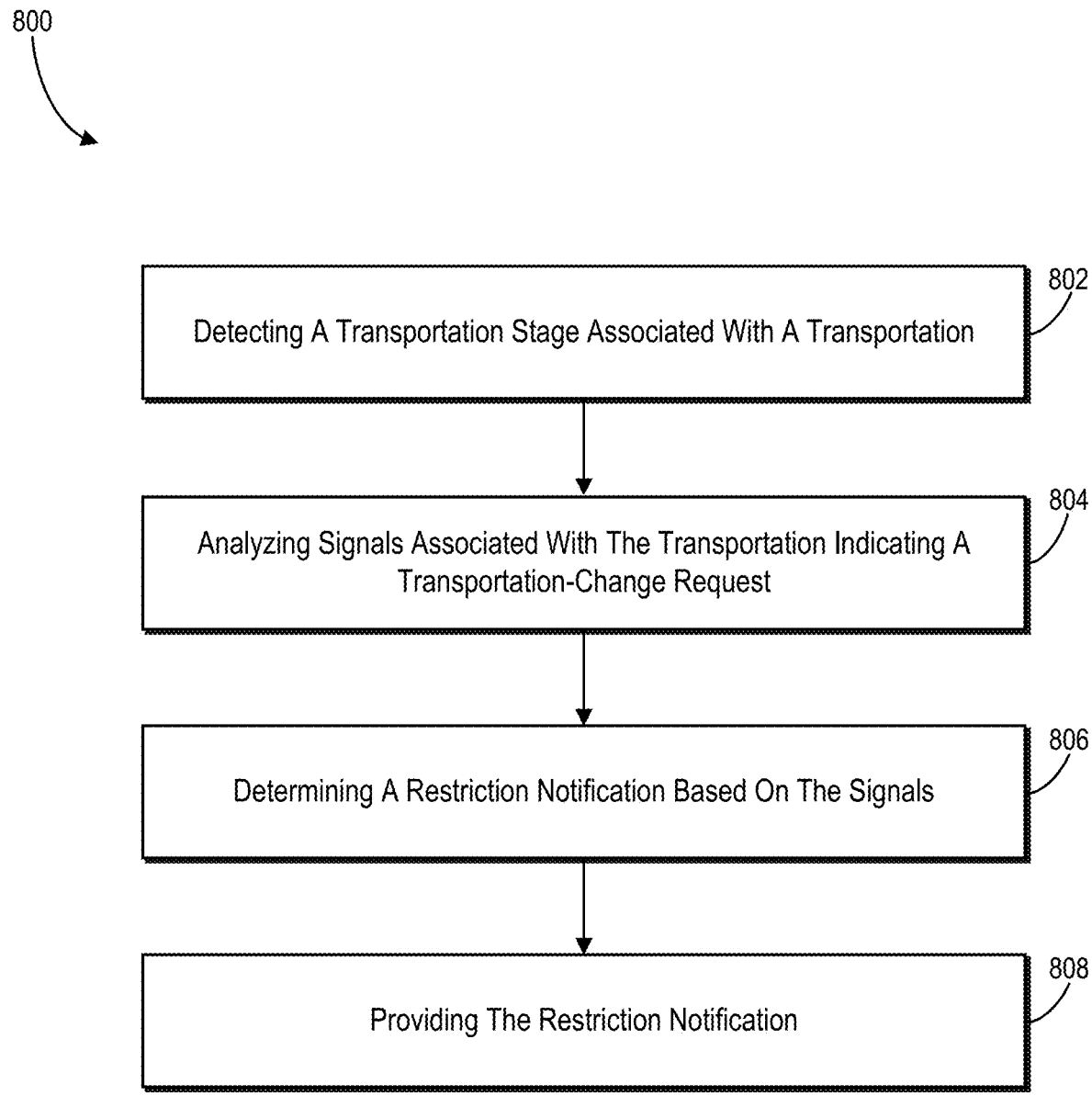
FIG. 8 illustrates a flowchart of a series of acts in a method of generating a restriction notification in accordance with one or more embodiments.

FIGS. 1-7, the corresponding text, and the examples provide several different systems, methods, techniques, components, and/or devices of the transportation change system 105 in accordance with one or more embodiments. In addition to the above description, FIG. 8 illustrates a flowchart of a series of acts 800 for generating a restriction notification in accordance with one or more embodiments. The transportation change system 105 may perform one or more acts of the series of acts 800 in addition to or alternatively to one or more acts described in conjunction with other figures. While FIG. 8 illustrates acts according to a respective embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 802 of detecting a transportation stage associated with a transportation. In particular, the act 802 can involve detecting one or more transportation stages associated with transportation of a requestor to a destination by a vehicle. For example, detecting the one or more transportation stages associated with the transportation can include detecting the mobile device in one or more of: an offline stage, an idling stage, a pickup stage, an in-transit stage, or a drop-off stage.

As further shown in FIG. 8, the series of acts 800 includes an act 804 of analyzing signals associated with the transportation indicating a transportation-change request. In particular, the act 804 can involve analyzing one or more signals associated with the transportation that indicate a transportation-change request. For example, analyzing the one or more signals associated with the transportation can include: determining a signal vector based on the signals associated with the transportation; and generating a transportation-restriction metric indicating the restriction preventing the transportation change based on the signal vector utilizing a transportation-change-machine-learning model. In some embodiments, the transportation-change request comprises a request to change the destination associated with the transportation, a request to modify a route associated with the transportation, or a request to add or change a waypoint along the route associated with the transportation.

In at least one embodiment, the series of acts 800 includes an act of identifying the one or more signals associated with the transportation by identifying one or more of: payment-card information associated with a payment card corresponding to the transportation request; a transportation history of a provider associated with the vehicle; a number of previous requests for transportation associated with an account of the requestor; an account-opening time for opening the account of the requestor relative to a requesting time for the request for the transportation by the requestor to the first destination; the requesting time for the request relative to a change-request time for the transportation-change request; a distance of the mobile device from a pickup location for the transportation at the change-request time for the transportation-change request; or a source of the transportation-change request.

Moreover, the series of acts includes an act 806 of determining a restriction notification based on the signals. In particular, the act 806 can involve determining a notification for a mobile device associated with the vehicle based on the one or more signals indicating the transportation-change request. For example, determining a notification for the mobile device can be based on display preferences associated with the mobile device.

Additionally, as shown in FIG. 8, the series of acts includes an act 808 of providing the restriction notification. In particular, the act 808 can involve providing the notification for display on the mobile device, wherein the notification indicates restriction preventing a transportation change. For example, the transportation change can include a change to the destination associated with the transportation of the requestor. In one or more embodiments, providing the notification for display on the mobile device includes: determining the vehicle is in a safe condition for receiving the notification based on a plurality of safety factors; and providing the notification to the mobile device based on determining the vehicle is in the safe condition. In one or more embodiments, the plurality of safety factors comprises one or more of: a detected speed of the vehicle associated with the mobile device; a detected transportation stage associated with the transportation; traffic conditions associated with a detected location of the vehicle associated with the mobile device; or weather conditions associated with the detected location of the vehicle associated with the mobile device.

In at least one embodiment, analyzing the one or more signals associated with the transportation can include analyzing a signal indicating the vehicle is traveling less than a threshold speed; and providing the notification comprises providing the notification for display on the mobile device based on the signal indicating the vehicle is traveling less than the threshold speed. Additionally or alternatively, in at least one embodiment, analyzing the one or more signal associated with the transportation that indicate the transportation-change request comprises analyzing the one or more signals at a transportation stage of the one or more transportation stages for picking up the requestor; and providing the notification comprises providing the notification for display on the mobile device at the transportation stage of the one or more transportation stages for picking up the requestor.

Figure 9:
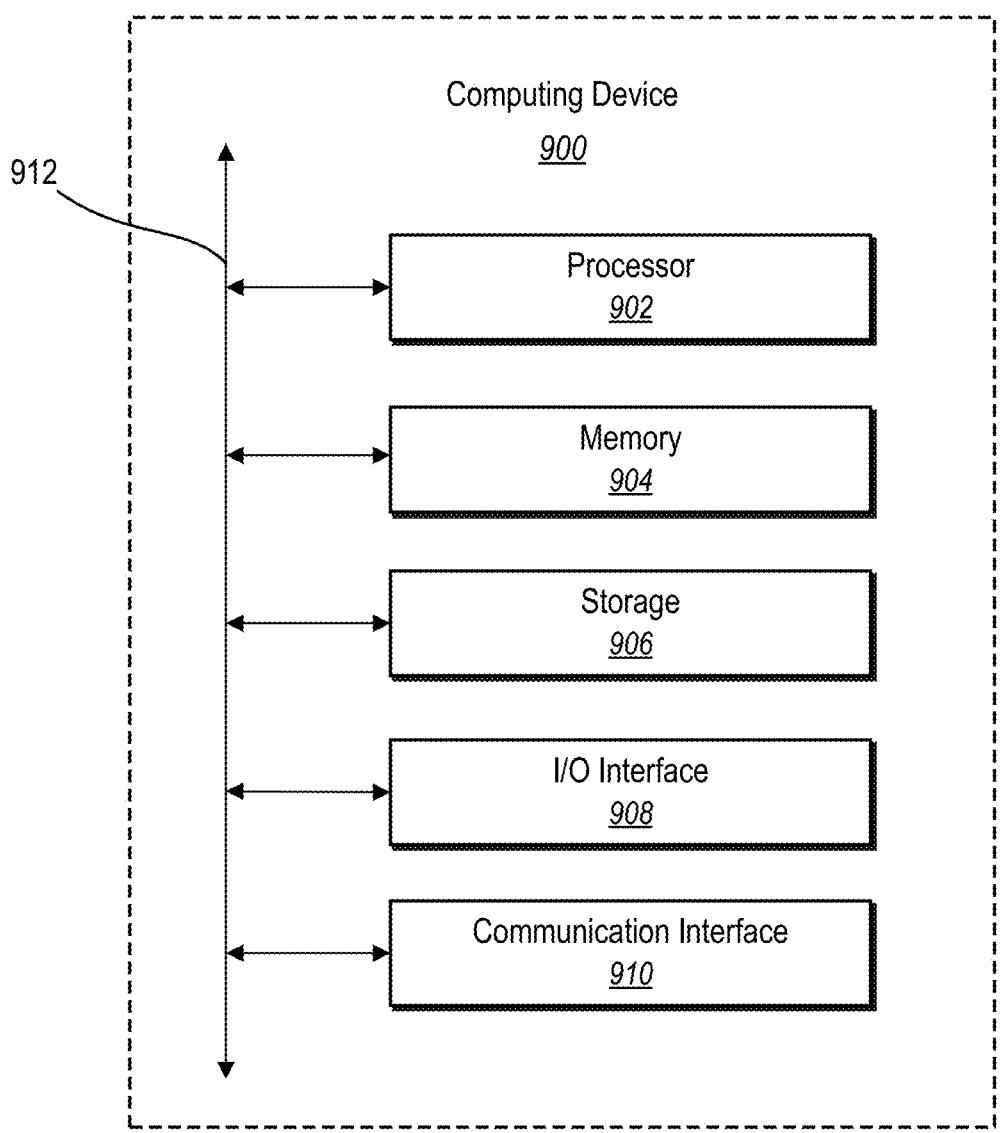
FIG. 9 illustrates a block diagram of an example computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., the computing system 700, the server(s) 102, the requestor client devices 116a-116n, the provider client devices 110a-110n). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of the computing device 900 to each other.

Figure 10:
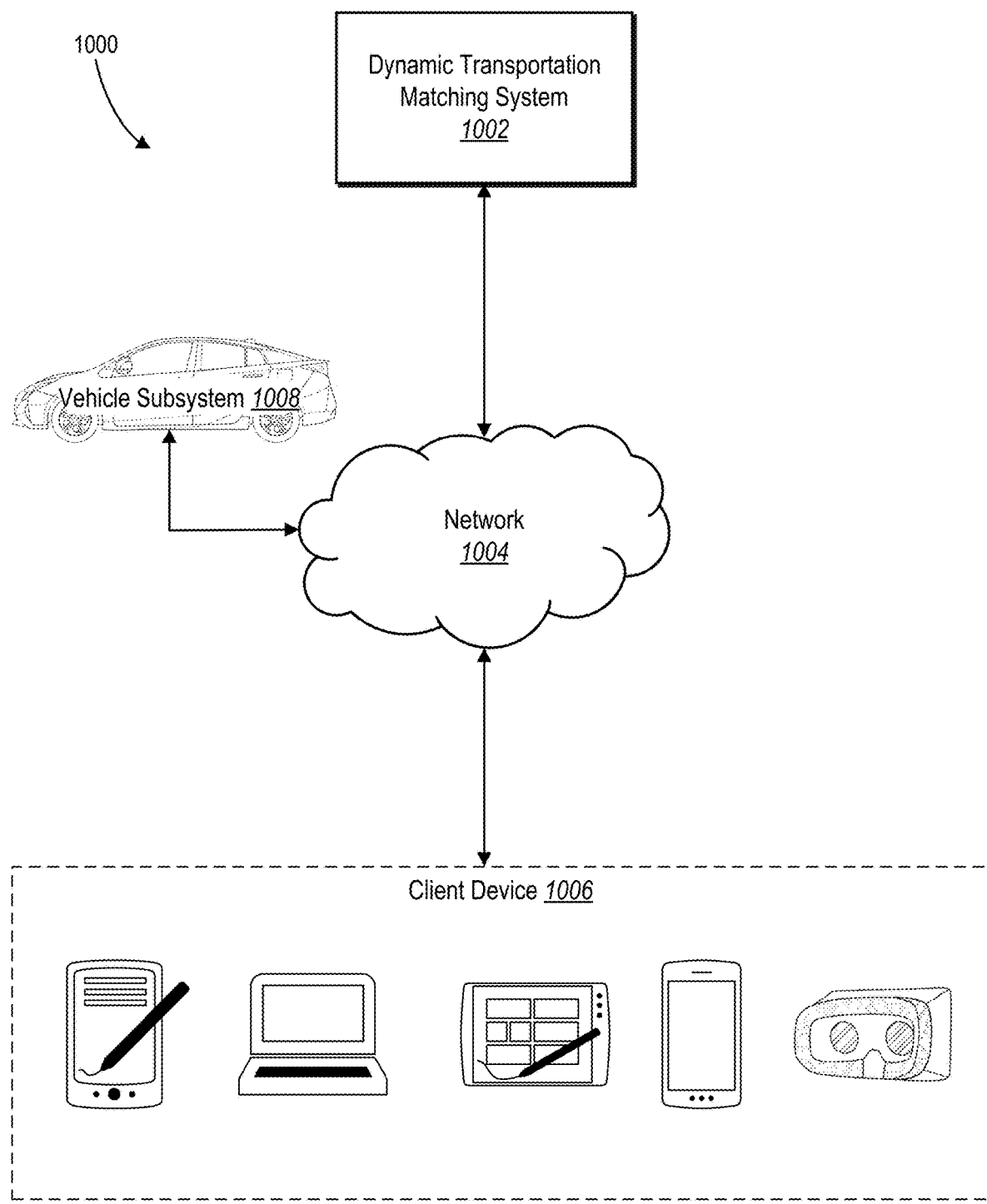
FIG. 10 illustrates an example network environment of a dynamic transportation matching system in accordance with one or more embodiments.

FIG. 10 illustrates an example network environment 1000 of a dynamic transportation matching system (e.g., the dynamic transportation matching system 104). The network environment 1000 includes a client device 1006, a dynamic transportation matching system 1002, and a vehicle subsystem 1008 connected to each other by a network 1004. Although FIG. 10 illustrates a particular arrangement of the client device 1006, the dynamic transportation matching system 1002, the vehicle subsystem 1008, and the network 1004, this disclosure contemplates any suitable arrangement of the client device 1006, the dynamic transportation matching system 1002, the vehicle subsystem 1008, and the network 1004. As an example, and not by way of limitation, two or more of the client devices 1006, the dynamic transportation matching system 1002, and the vehicle subsystem 1008 communicate directly, bypassing the network 1004. As another example, two or more of the client devices 1006, the dynamic transportation matching system 1002, and the vehicle subsystem 1008 may be physically or logically co-located with each other in whole or in part. Moreover, although FIG. 10 illustrates a particular number of the client devices 1006, the dynamic transportation matching systems 1002, the vehicle subsystems 1008, and the networks 1004, this disclosure contemplates any suitable number of the client devices 1006, the dynamic transportation matching systems 1002, the vehicle subsystems 1008, and the networks 1004. As an example, and not by way of limitation, the network environment 1000 may include multiple client devices 1006, the dynamic transportation matching systems 1002, the vehicle subsystems 1008, and the networks 1004.

This disclosure contemplates any suitable network 1004. As an example, and not by way of limitation, one or more portions of the network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1004 may include one or more networks 1004.

Links may connect the client device 1006, the dynamic transportation matching system 1002, and the vehicle subsystem 1008 to the communication network 1004 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1000. One or more first links may differ in one or more respects from one or more second links.

In particular embodiments, the client device 1006 may be an electronic device including hardware, software, or embedded logic components or a combination of two or more such components and capable of carrying out the appropriate functionalities implemented or supported by the client device 1006. As an example, and not by way of limitation, a client device 1006 may include any of the computing devices discussed above in relation to FIG. 10. A client device 1006 may enable a network user at the client device 1006 to access a network. A client device 1006 may enable its user to communicate with other users at other client devices 1006.

In particular embodiments, the client device 1006 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1006 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 1006 one or more Hyper Text Markup Language (HTML) files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the dynamic transportation matching system 1002 may be a network-addressable computing system that can host a ride share transportation network. The dynamic transportation matching system 1002 may generate, store, receive, and send data, such as, for example, user-profile data, concept-profile data, text data, ride request data, GPS location data, provider data, requestor data, vehicle data, or other suitable data related to the ride share transportation network. This may include authenticating the identity of providers and/or vehicles who are authorized to provide ride services through the dynamic transportation matching system 1002. In addition, the transportation service system may manage identities of service requestors such as users/requestors. In particular, the transportation service system may maintain requestor data such as driving/riding histories, personal data, or other user data in addition to navigation and/or traffic management services or other location services (e.g., GPS services).

In particular embodiments, the dynamic transportation matching system 1002 may manage ride matching services to connect a user/requestor with a vehicle and/or provider. By managing the ride matching services, the dynamic transportation matching system 1002 can manage the distribution and allocation of vehicle subsystem resources and user resources such as GPS location and availability indicators, as described herein.

The dynamic transportation matching system 1002 may be accessed by the other components of the network environment 1000 either directly or via network 1004. In particular embodiments, the dynamic transportation matching system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the dynamic transportation matching system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, or a dynamic transportation matching system 1002 to manage, retrieve, modify, add, or delete, the information stored in data store.

In particular embodiments, the dynamic transportation matching system 1002 may provide users with the ability to take actions on various types of items or objects, supported by the dynamic transportation matching system 1002. As an example, and not by way of limitation, the items and objects may include ride share networks to which users of the dynamic transportation matching system 1002 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the dynamic transportation matching system 1002 or by an external system of a third-party system, which is separate from the dynamic transportation matching system 1002 and coupled to the dynamic transportation matching system 1002 via a network 1004.

In particular embodiments, the dynamic transportation matching system 1002 may be capable of linking a variety of entities. As an example, and not by way of limitation, the dynamic transportation matching system 1002 may enable users to interact with each other or other entities, or to allow users to interact with these entities through an application programming interfaces (API) or other communication channels.

In particular embodiments, the dynamic transportation matching system 1002 may include a variety of servers, sub-systems, programs, modules, logs, and data stores. In particular embodiments, the dynamic transportation matching system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The dynamic transportation matching system 1002 may also include suitable components such as network interfaces, security mechanisms, load balancers, failover servers, management-and-network-operations consoles, other suitable components, or any suitable combination thereof. In particular embodiments, the dynamic transportation matching system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the dynamic transportation matching system 1002 and one or more client devices 1006. An action logger may be used to receive communications from a web server about a user's actions on or off the dynamic transportation matching system 1002. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from the client device 1006 responsive to a request received from the client device 1006. Authorization servers may be used to enforce one or more privacy settings of the users of the dynamic transportation matching system 1002. A privacy setting of a user determines how particular information associated with a user can be shared. The authorization server may allow users to opt in to or opt out of having their actions logged by the dynamic transportation matching system 1002 or shared with other systems, such as, for example, by setting appropriate privacy settings. Third-party-content-object stores may be used to store content objects received from third parties. Location stores may be used for storing location information received from the client devices 1006 associated with users.

In addition, the vehicle subsystem 1008 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 1008 can include an autonomous vehicle—i.e., a vehicle that does not require a human operator. In these embodiments, the vehicle subsystem 1008 can perform maneuvers, communicate, and otherwise function without the aid of a human provider, in accordance with available technology.

In particular embodiments, the vehicle subsystem 1008 may include one or more sensors incorporated therein or associated thereto. For example, sensor(s) can be mounted on the top of the vehicle subsystem 1008 or else can be located within the interior of the vehicle subsystem 1008. In certain embodiments, the sensor(s) can be located in multiple areas at once—i.e., split up throughout the vehicle subsystem 1008 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requestor.

In particular embodiments, the vehicle subsystem 1008 may include a communication device capable of communicating with the client device 1006 and/or the dynamic transportation matching system 1002. For example, the vehicle subsystem 1008 can include an on-board computing device communicatively linked to the network 1004 to transmit and receive data such as GPS location information, sensor-related information, requestor location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A system comprising:
   at least one processor; and
   at least one non-transitory computer-readable storage medium storing instructions thereon that, when executed by the at least one processor, cause the system to:
   detect one or more transportation stages associated with transportation of a requestor to a destination by a vehicle;
   identify, by analyzing one or more signals associated with the transportation that indicate a transportation-change request, a deviation of the vehicle from a predetermined route associated with the transportation of the requestor to the destination;
   determine a notification for a mobile device associated with the vehicle based on the one or more signals indicating the deviation of the vehicle from the predetermined route;
   provide, for display within a graphical user interface of the mobile device, the notification indicating a restriction preventing a transportation change; and
   restrict a mobile application of the mobile device from executing the transportation change.

2. The system as recited in claim 1, wherein the transportation-change request comprises a request to change the destination associated with the transportation, a request to modify a route associated with the transportation, or a request to add or change a waypoint along the route associated with the transportation.

3. The system as recited in claim 1, further comprising instructions that, when executed by the at least one processor, cause the system to:
   analyze the one or more signals associated with the transportation by analyzing a signal indicating the vehicle is traveling less than a threshold speed; and
   provide the notification by providing the notification for display on the mobile device based on the signal indicating the vehicle is traveling less than the threshold speed.

4. The system as recited in claim 1, further comprising instructions that, when executed by the at least one processor, cause the system to disable at least a portion of the graphical user interface by locking a navigation map within the graphical user interface.

5. The system as recited in claim 1, further comprising instructions that, when executed by the at least one processor, cause the system to analyze the one or more signals associated with the transportation by:
- determining a signal vector based on the one or more signals associated with the transportation; and
- generating a transportation-restriction metric indicating the restriction preventing the transportation change based on the signal vector utilizing a transportation-change-machine-learning model.

6. The system as recited in claim 1, further comprising instructions that, when executed by the at least one processor, cause the system to identify the one or more signals associated with the transportation by identifying one or more of:
- a transportation history of a provider associated with the vehicle;
- a number of previous requests for transportation associated with an account of the requestor;
- an account-opening time for opening the account of the requestor relative to a requesting time for a request for the transportation by the requestor to the destination;
- the requesting time for the request relative to a change-request time for the transportation-change request; or
- a distance of the mobile device from a pickup location for the transportation at the change-request time for the transportation-change request.

7. The system as recited in claim 1, further comprising instructions that, when executed by the at least one processor, cause the system to provide the notification for display on the mobile device by:
- determining the vehicle is in a safe condition for receiving the notification based on a plurality of safety factors; and
- providing the notification to the mobile device based on determining the vehicle is in the safe condition.

8. The system as recited in claim 7, wherein the plurality of safety factors comprises one or more of:
- a detected speed of the vehicle associated with the mobile device;
- a detected transportation stage associated with the transportation;
- traffic conditions associated with a detected location of the vehicle associated with the mobile device; or
- weather conditions associated with the detected location of the vehicle associated with the mobile device.

9. A method comprising:
- detecting one or more transportation stages associated with transportation of a requestor to a destination by a vehicle;
- identifying, by analyzing one or more signals associated with the transportation that indicate a transportation-change request, a deviation of the vehicle from a predetermined route associated with the transportation of the requestor to the destination;
- determining a notification for a mobile device associated with the vehicle based on the one or more signals indicating the deviation of the vehicle from the predetermined route;
- providing, for display within a graphical user interface of the mobile device, the notification indicating a restriction preventing a transportation change; and
- restricting a mobile application of the mobile device from executing the transportation change.

10. The method as recited in claim 9, wherein the transportation-change request comprises a request to change the destination associated with the transportation, a request to modify a route associated with the transportation, or a request to add or change a waypoint along the route associated with the transportation.

11. The method as recited in claim 9, wherein:
- analyzing the one or more signals associated with the transportation that indicate the transportation-change request comprises analyzing the one or more signals at a transportation stage of the one or more transportation stages for picking up the requestor; and
- providing the notification comprises providing the notification for display on the mobile device at the transportation stage for picking up the requestor.

12. The method as recited in claim 9, further comprising detecting the one or more transportation stages associated with the transportation by detecting the mobile device in one or more of: an offline stage, an idling stage, a pickup stage, an in-transit stage, or a drop-off stage.

13. The method as recited in claim 9, wherein analyzing the one or more signals associated with the transportation comprises:
- determining a signal vector based on the one or more signals associated with the transportation; and
- generating a transportation-restriction metric indicating the restriction preventing the transportation change based on the signal vector utilizing a transportation-change-machine-learning model.

14. The method as recited in claim 9, further comprising identifying the one or more signals associated with the transportation by identifying one or more of:
- a transportation history of a provider associated with the vehicle;
- a number of previous requests for transportation associated with an account of the requestor;
- an account-opening time for opening the account of the requestor relative to a requesting time for a request for the transportation by the requestor to the destination;
- the requesting time for the request relative to a change-request time for the transportation-change request; or
- a distance of the mobile device from a pickup location for the transportation at the change-request time for the transportation-change request.

15. The method as recited in claim 9, wherein providing the notification for display on the mobile device comprises:
- determining the vehicle is in a safe condition for receiving the notification based on a plurality of safety factors; and
- providing the notification to the mobile device based on determining the vehicle is in the safe condition.

16. The method as recited in claim 9, wherein the notification includes a statement that the destination associated with the transportation, a route associated with the transportation, or a waypoint along the route associated with the transportation cannot be changed.

17. A non-transitory computer-readable medium storing instructions thereon that, when executed by at least one processor, cause a computer system to:
- detect one or more transportation stages associated with transportation of a requestor to a destination by a vehicle;
- identify, by analyzing one or more signals associated with the transportation that indicate a transportation-change request, a deviation of the vehicle from a predetermined route associated with the transportation of the requestor to the destination;
- determine a notification for a mobile device associated with the vehicle based on the one or more signals indicating the deviation of the vehicle from the predetermined route;

provide, for display within a graphical user interface of the mobile device, the notification indicating a restriction preventing a transportation change; and restrict a mobile application of the mobile device from executing the transportation change.

18. The non-transitory computer-readable medium as recited in claim 17, wherein the transportation-change request comprises a request to change the destination associated with the transportation, a request to modify a route associated with the transportation, or a request to add or change a waypoint along the route associated with the transportation.

19. The non-transitory computer-readable medium as recited in claim 17, further comprising instructions that, when executed by the at least one processor, cause the computer system to:

analyze the one or more signals associated with the transportation that indicate a transportation-change request by analyzing the one or more signals at a transportation stage of the one or more transportation stages for picking up the requestor; and provide the notification by providing the notification for display on the mobile device at the transportation stage for picking up the requestor.

20. The non-transitory computer-readable medium as recited in claim 17, further comprising instructions that, when executed by the at least one processor, cause the computer system to provide the notification for display on the mobile device by:

determining the vehicle is in a safe condition for receiving the notification based on a plurality of safety factors; and providing the notification to the mobile device based on determining the vehicle is in the safe condition.

* * * * *